(12) United States Patent
Khadloya et al.

(10) Patent No.: US 11,295,139 B2
(45) Date of Patent: Apr. 5, 2022

(54) HUMAN PRESENCE DETECTION IN EDGE DEVICES

(71) Applicant: INTELLIVISION TECHNOLOGIES CORP., San Jose, CA (US)

(72) Inventors: Krishna Khadloya, San Jose, CA (US); Maxim Sokolov, Nizhny Novgorod (RU); Vaidhi Nathan, San Jose, CA (US); Chandan Gope, Cupertino, CA (US)

(73) Assignee: INTELLIVISION TECHNOLOGIES CORP., San Jose, CA (US)

( * ) Notice: Subject to any disclaimer, the term of this patent is extended or adjusted under 35 U.S.C. 154(b) by 162 days.

(21) Appl. No.: 16/279,512

(22) Filed: Feb. 19, 2019

(65) Prior Publication Data

US 2019/0258866 A1 Aug. 22, 2019

Related U.S. Application Data

(60) Provisional application No. 62/632,416, filed on Feb. 19, 2018, provisional application No. 62/632,417, filed on Feb. 19, 2018.

(51) Int. Cl.
*G06K 9/00* (2006.01)
*G08B 13/196* (2006.01)
(Continued)

(52) U.S. Cl.
CPC ..... *G06K 9/00771* (2013.01); *G06K 9/00369* (2013.01); *G06K 9/00711* (2013.01);
(Continued)

(58) Field of Classification Search
CPC .......... G06K 9/00771; G06K 9/00369; G06K 9/00711; G06T 7/215; G06T 7/246; G08B 13/19608
See application file for complete search history.

(56) References Cited

U.S. PATENT DOCUMENTS

| 6,028,626 A | 2/2000 | Aviv |
| 6,069,655 A | 5/2000 | Seeley et al. |

(Continued)

FOREIGN PATENT DOCUMENTS

| CN | 104346607 A | 11/2014 |
| CN | 105931406 A | 9/2016 |

(Continued)

OTHER PUBLICATIONS

Google scholar search results.*

(Continued)

*Primary Examiner* — Qun Shen
(74) *Attorney, Agent, or Firm* — Schwegman Lundberg & Woessner, P.A.

(57) ABSTRACT

A system and method for detecting human presence in or absence from a field-of-view of a camera by analyzing camera data using a processor inside of or adjacent to the camera itself. In an example, the camera can be integrated with or embedded in another edge-based sensor device. In an example, a video signal processing system receives image data from one or more image sensors and uses a local processing circuit to process the image data and determine if a human being is or is not present during a particular time, interval, or sequence of frames. In an example, the human being identification technique can be used in security or surveillance applications such as for home, business, or other monitoring cameras.

20 Claims, 12 Drawing Sheets

(51) Int. Cl.
*G06T 7/246* (2017.01)
*G06T 7/215* (2017.01)

(52) U.S. Cl.
CPC .............. *G06T 7/215* (2017.01); *G06T 7/246* (2017.01); *G08B 13/19608* (2013.01)

(56) References Cited

U.S. PATENT DOCUMENTS

| | | | |
|---|---|---|---|
| 6,184,926 | B1 | 2/2001 | Khosravi et al. |
| 6,421,462 | B1* | 7/2002 | Christian ............ G06K 9/00369 345/2.2 |
| 6,594,629 | B1 | 7/2003 | Basu et al. |
| 6,681,032 | B2 | 1/2004 | Bortolussi et al. |
| 6,940,545 | B1 | 9/2005 | Ray et al. |
| 7,113,090 | B1 | 9/2006 | Saylor et al. |
| 7,227,567 | B1* | 6/2007 | Beck ...................... H04N 7/147 348/14.01 |
| 7,391,907 | B1 | 6/2008 | Venetianer et al. |
| 7,796,780 | B2 | 9/2010 | Lipton et al. |
| 7,801,330 | B2 | 9/2010 | Zhang et al. |
| 7,847,820 | B2 | 12/2010 | Vallone et al. |
| 7,999,857 | B2 | 8/2011 | Bunn et al. |
| 8,139,098 | B2 | 3/2012 | Carter |
| 8,564,661 | B2 | 10/2013 | Lipton et al. |
| 8,660,249 | B2 | 2/2014 | Rondeau et al. |
| 9,105,053 | B2 | 8/2015 | Cao et al. |
| 9,176,608 | B1 | 11/2015 | Baldwin et al. |
| 9,208,675 | B2 | 12/2015 | Xu et al. |
| 9,224,044 | B1 | 12/2015 | Laska et al. |
| 9,230,560 | B2 | 1/2016 | Ehsani et al. |
| 9,313,312 | B2 | 4/2016 | Merrow et al. |
| 9,373,076 | B1* | 6/2016 | Appelman .............. G06F 16/50 |
| 9,479,354 | B2 | 10/2016 | Yamanishi et al. |
| 9,740,940 | B2 | 8/2017 | Chattopadhyay et al. |
| 9,756,233 | B2 | 9/2017 | Lee et al. |
| 9,805,266 | B2 | 10/2017 | Zhang et al. |
| 10,073,428 | B2 | 9/2018 | Bruhn et al. |
| 10,102,495 | B1 | 10/2018 | Zhang et al. |
| 10,769,442 | B1* | 9/2020 | Ding .................. G06K 9/00335 |
| 2003/0137590 | A1 | 7/2003 | Barnes et al. |
| 2003/0163289 | A1 | 8/2003 | Whelan et al. |
| 2005/0267605 | A1 | 12/2005 | Lee et al. |
| 2006/0170769 | A1* | 8/2006 | Zhou ................ G08B 13/19613 348/143 |
| 2006/0190419 | A1 | 8/2006 | Bunn et al. |
| 2007/0002141 | A1 | 1/2007 | Lipton et al. |
| 2007/0098220 | A1 | 5/2007 | Pilu et al. |
| 2008/0002856 | A1 | 1/2008 | Ma et al. |
| 2009/0041297 | A1 | 2/2009 | Zhang et al. |
| 2009/0315996 | A1 | 12/2009 | Guler et al. |
| 2012/0020524 | A1* | 1/2012 | Ishikawa ................ H04N 7/183 382/103 |
| 2012/0026328 | A1 | 2/2012 | Sethna et al. |
| 2013/0235195 | A1 | 9/2013 | Fujisaki et al. |
| 2013/0250050 | A1 | 9/2013 | Kanaujia et al. |
| 2013/0275138 | A1 | 10/2013 | Gruber et al. |
| 2014/0222436 | A1 | 8/2014 | Binder et al. |
| 2014/0347475 | A1 | 11/2014 | Divakaran et al. |
| 2015/0371520 | A1* | 12/2015 | DeLean ............. G06K 9/00369 382/103 |
| 2016/0180195 | A1* | 6/2016 | Martinson ............ G06K 9/6202 382/103 |
| 2016/0180667 | A1 | 6/2016 | Bunker et al. |
| 2016/0217326 | A1* | 7/2016 | Hosoi ................ G06K 9/00369 |
| 2017/0053191 | A1 | 2/2017 | Koyama |
| 2017/0213080 | A1 | 7/2017 | Nathan et al. |
| 2017/0213081 | A1 | 7/2017 | Nathan et al. |
| 2018/0031700 | A1* | 2/2018 | Horishita ................ G01S 15/08 |
| 2018/0129885 | A1 | 5/2018 | Potter et al. |
| 2018/0165637 | A1 | 6/2018 | Romero et al. |
| 2018/0285647 | A1* | 10/2018 | Chen .................. G06K 9/00718 |
| 2018/0342329 | A1 | 11/2018 | Rufo et al. |
| 2019/0043290 | A1 | 2/2019 | Morris et al. |
| 2019/0303684 | A1 | 10/2019 | Khadloya et al. |

FOREIGN PATENT DOCUMENTS

| | | |
|---|---|---|
| CN | 106372576 A | 2/2017 |
| CN | 206712917 U | 12/2017 |
| CN | 107609512 A | 1/2018 |
| CN | 108540762 A | 9/2018 |
| CN | 108734300 A | 11/2018 |
| EP | 0772169 A2 | 5/1997 |
| JP | 2007315965 A | 12/2007 |

OTHER PUBLICATIONS

U.S. Appl. No. 16/442,230, filed Jun. 14, 2019, Object Detection in Edge Devices for Barrier Operation and Parcel Delivery.

"Chamberlain Group and Amazon Team Up To Offer In-Garage Delivery", Chamberlain Group, Oak Brook, IL, [Online] Retrieved from the internet on May 1, 2019: <URL: https://www.chamberlaingroup.com/2019/01/07/chamberlain-group-and-amazon-team-up-to-offer-in-garage-delivery/>, (Jan. 7, 2019), 5 pgs.

Newcomb, Alyssa, "Amazon Will Now Deliver Inside Your Home—And Record the Whole Thing", NBC News, [Online] Retrieved from the internet on May 1, 2019: <URL: https://www.nbcnews.com/tech/tech-news/amazon-will-now-deliver-inside-your-home-record-whole-thing-n814276>, (Oct. 25, 2017), 3 pgs.

"Eyewatch", Eyewatch Website, URL: https://eye-watch.in/Login.action, (accessed Feb. 4, 2019), 11 pgs.

"Home Automation with Smart Speakers—Amazon Echo vs. Google Home vs. Apple HomePod", Citius Minds Blog, accessed Feb. 4, 2019, URL: https://www.citiusminds.com/blog/wp-content/uploads/2017/08/Home_Automation_Smart_Speakers.pdf, (Aug. 2017), 20 pgs.

Amaryllo International, "ATOM, First Intelligent Security Robot That Recognizes Faces", Kickstarter (Online), accessed Feb. 19, 2019, URL: https://www.kickstarter.com/projects/555543571/atom-the-first-intelligent-security-robot, (2016), 48 pgs.

Chang, Vincent, "Beseye Pro: Clever design and people recognition", The Straits Times (Online), accessed Feb. 19, 2019, URL: https://www.straitstimes.com/tech/cameras/beseye-pro-clever-design-and-people-recognition, (Feb. 14, 2017), 4 pgs.

Huang, Hua, et al., "WiDet: Wi-Fi Based Device-Free Passive Person Detection with Deep Convolutional Neural Networks", Proc. of the 21st ACM Intl. Conference on Modeling, Analysis and Simulation of Wireless and Mobile Systems (MSWIM), (2018), 53-60.

Jacobson, Julie, "Patent: Vivint 'Door Knock' Tech Might Help Identify Guests by Unique Sound Signatures", CE Pro Magazine and Website, accessed Feb. 4, 2019, URL: https://www.cepro.com/article/patent_audio_analytics_ai_vivint_door_knock_identify_people_sound_signature, (Apr. 20, 2017), 7 pgs.

Jurrien, Ilse, "Samsung Bixby Smart Speaker met Camera en Display", LetsGo Digital, accessed Feb. 4, 2019, w/English machine translation, URL: https://nl.letsgodigital.org/speakers-hifi/samsung-bixby-smart-speaker/, (Jun. 13, 2018), 12 pgs.

Metz, Rachel, et al., "Using Deep Learning to Make Video Surveillance Smarter", MIT Technology Review Online, accessed Feb. 4, 2019, URL: https://www.technologyreview.com/s/540396/using-deep-learning-to-make-video-surveillance-smarter/, (Aug. 17, 2015), 3 pgs.

Rasti, Pejman, et al., "Convolutional Neural Network Super Resolution for Face Recognition in Surveillance Monitoring", Proc. of the Intl. Conference on Articulated Motion and Deformable Objects (AMDO), (Jul. 2, 2016), 175-184.

Shaw, C. Mitchell, "New Patents: Google Wants to Monitor Everything You and Your Children Do at Home", The New American, accessed Feb. 4, 2019, URL: https://www.thenewamerican.com/tech/computers/item/30733-new-patents-google-wants-to-monitor-everything-you-and-your-children-do-at-home, (Nov. 26, 2018), 9 pgs.

Shu, Guang, "Human Detection, Tracking and Segmentation in Surveillance Video", PhD Dissertation at the U. of Central Florida, Orlando, (2014), 147 pgs.

(56) References Cited

OTHER PUBLICATIONS

Whitney, Lance, "How to Call Someone From Your Amazon Echo", PC Magazine Online, accessed Feb. 4, 2019, URL: https://www.pcmag.com/feature/358674/how-to-call-someone-from-your-amazon-echo, (Dec. 25, 2018), 13 pgs.

Ansari, Mohamed EL, et al., "A Hybrid Pedestrian Detection System based on Visible Images and LIDAR Data", Proc. of the 13th Intl. Joint Conference on Computer Vision, Imaging and Computer Graphics Theory and Applications (VISIGRAPP), (2018), 10 pgs.

Banerjee, Prithviraj, et al., "Human Motion Detection and Tracking for Video Surveillance", Proc. of the National Conference of Tracking and Video Surveillance Activity Analysis, (2008), 5 pgs.

Bhavani, K., et al., "Real time Face Detection and Recognition in Video Surveillance", International Research Journal of Engineering and Technology (IRJET), vol. 4, Issue 6, (Jun. 2017), 4 pgs.

He, Li, et al., "Human Detection using Mobile Embedded Smart Cameras", 5th ACM/IEEE Intl. Conference on Distributed Smart Cameras (ICDSC), (2011), 6 pgs.

Hsu, Jeremy, "Object-Detection Software to Enable Search Within Videos", Popular Science (Online), accessed Feb. 19, 2019, URL: https://www.popsci.com/technology/article/2009-11/computers-could-someday-search-objects-within-videos, (Nov. 4, 2009), 2 pgs.

Lei, Zhen, et al., "Real-time Face Detection and Recognition for Video Surveillance Applications", World Congress on Computer Science and Information Engineering, (2009), 5 pgs.

Lovell, Brian C., et al., "Real-time Face Detection and Classification for ICCTV", Encyclopedia of Data Warehousing and Mining, (2009), 19 pgs.

Mahdi, Fahad Parvez, et al., "Face recognition-based real-time system for surveillance", Intelligent Decision Technologies 11, (2017), 14 pgs.

Paul, Manoranjan, et al., "Human detection in surveillance videos and its applications—a review", EURASIP Journal on Advances in Signal Processing, (2013), 16 pgs.

Rosebrock, Adrian, "Real-time object detection with deep learning and OpenCV", PyImageSearch (Online), accessed Feb. 19, 2019, URL: https://www.pyimagesearch.com/2017/09/18/real-time-object-detection-with-deep-learning-and-opencv/, (Sep. 18, 2017), 9 pgs.

Upasana, Ahire, et al., "Real Time Security System using Human Motion Detection", Intl. Journal of Computer Science and Mobile Computing, vol. 4, Issue 11, (Nov. 2015), 6 pgs.

Vijayakumar, J., et al., "Human Motion Detection in Video Surveillance Using Computer Vision Technique", Intl. Research Journal of Engineering and Technology (IRJET), vol. 4, Issue 8, (Aug. 2017), 5 pgs.

"U.S. Appl. No. 16/442,230, Non Final Office Action dated Jul. 29, 2021", 16 pages.

\* cited by examiner

|    | C1   | C2  | C3   | C4   |
|----|------|-----|------|------|
| R1 | V_10 | V_8 | V_6  | V_4  |
| R2 | V_1  | V_7 | V_10 | V_9  |
| R3 | V_9  | V_7 | V_10 | V_5  |
| R4 | V_5  | V_2 | V_7  | V_10 |

FIG. 7

HUMAN PRESENCE DETECTION IN EDGE DEVICES

CLAIM OF PRIORITY

This patent application claims the benefit of priority of U.S. Provisional Patent Application Ser. No. 62/632,417, entitled "System and Method for human detection inside cameras", filed on Feb. 19, 2018, and this patent application claims the benefit of priority of U.S. Provisional Patent Application Ser. No. 62/632,416, entitled "System and Method for creating data dashboards from video streams for operational intelligence", filed on Feb. 19, 2018, the benefit of priority of each of which is claimed hereby, and each of which is incorporated by reference herein in its entirety.

BACKGROUND

Video cameras, including webcams, mobile device-based cameras, closed-circuit or security cameras, or other edge-based devices, sensors, and other devices are prevalent in society. Internet or server-based systems can receive or use data from such cameras. In an example, machine vision technology can be used to process image data from cameras and determine whether specific objects exist in an environment monitored by a camera.

In an example, a camera system can be configured to detect motion using image data. In some cases, camera data is uploaded to a central server or processor that is configured to provide information about motion or configured to identify one or more objects in the environment. With advancing Internet technology, it is more feasible to provide web services that can automatically scale upon user demand, often by use of various types of automated service provisioning methods and virtual machine migration methods, such as can be used to process image data received from remote sources.

OVERVIEW

Various sensors can be configured to receive image and video data. For example, various home security and comfort or utility sensors can include, or can be modified to include, a visual sensor to capture image and video data. In an example, the image or video data can be captured when another sensor detects a particular event or condition such as fire or smoke, a glass break, a window or door opening, a temperature status, a light switch status, or other condition. In an example, human detection in the image or video data is performed manually by an operator who monitors the images and videos, or human detection is performed remotely to an image receiver using a networked server or processor. The present inventors have recognized that a problem to be solved includes performing human recognition in edge devices such as cameras using a minimum number of processing cycles and processing power. The present inventors have recognized that a problem to be solved includes performing human recognition in edge devices such as cameras or visual sensors embedded as part of one or more other sensors. In an example, human recognition allows for machine-based verification of a scene and can include verification of events as identified or captured by other sensors. For example, images and video clips can be used to verify a scene around the sensors and also alert for human presence which, in some cases, can increase a criticalness of some events like a building fire. Generally, as discussed herein, a camera is a visual sensor and the camera can be an independent device or can be embedded in other home, office, security, or other auxiliary sensor.

In an example, a solution to the problem includes combining multiple image analysis results at or in a camera with low power, and can thus perform human recognition in image data substantially in real-time. The solution can include an optimized runtime environment to execute neural network-based inferencing models. That is, the solution can include performing inferencing computations in a constrained processing environment, such as inside a low power camera device or other edge processor.

In an example, an edge-based device can include various types of sensors. Such sensors can include a general purpose sensor like a PIR (Passive Infra-Red) motion sensor, thermostat, door or window contact sensor, fire or smoke alarm or sensor, access-control card readers, and others. Some of these sensors may not have or include an integrated camera module, however, the present systems and methods can be used to augment such sensors by including a camera module in or appurtenant to such sensors.

Aspect 1 can include or use subject matter (such as an apparatus, a system, a device, a method, a means for performing acts, or a device readable medium including instructions that, when performed by the device, can cause the device to perform acts, or an article of manufacture), such as can include or use a method for determining whether a human being is present in or absent from an environment monitored by a camera using image information from the camera. In Aspect 1, the method can include receiving, at a first processor circuit, multiple frames from the camera, the multiple frames corresponding to a sequence of substantially adjacent time instances, and using the first processor circuit, identifying a difference between a portion of at least first and second frames from among the multiple frames, the difference indicating movement by an object in the environment monitored by the camera. Aspect 1 can include using the first processor circuit to select a third frame from among the multiple frames for full-frame analysis, and using the first processor circuit, applying the third frame as an input to a first neural network and, in response, receiving a first indication of a likelihood that the third frame includes at least a portion of an image of a human being. Aspect 1 can include using the first processor circuit to provide an indication that a human being is present in or absent from the environment monitored by the camera based on the identified difference and based on the received first indication of the likelihood that the third frame includes at least a portion of an image of a human being.

Aspect 2 can include or use, or can optionally be combined with the subject matter of Aspect 1, to optionally include selecting the third frame from among the multiple frames includes selecting a frame that includes information about a moving object in the environment.

Aspect 3 can include or use, or can optionally be combined with the subject matter of one or any combination of Aspects 1 or 2 to optionally include selecting the third frame from among the multiple frames includes selecting one of the first and second frames.

Aspect 4 can include or use, or can optionally be combined with the subject matter of one or any combination of Aspects 1 through 3 to optionally include selecting a classification model for use by the first neural network, wherein the classification model is optimized for image analysis at an angle or field of view corresponding to the angle or field of view of the camera.

Aspect 5 can include or use, or can optionally be combined with the subject matter of one or any combination of Aspects 1 through 4 to optionally include or use the first processor circuit being a processor circuit that is housed together with the camera.

Aspect 6 can include or use, or can optionally be combined with the subject matter of Aspect 5, to optionally include communicating, to a server located remotely from the camera, information about the indication that a human being is present in or absent from the environment.

Aspect 7 can include or use, or can optionally be combined with the subject matter of one or any combination of Aspects 1 through 6 to optionally include identifying the change in the one or more portions of the at least first and second frames, including applying the first frame or second frame as an input to a second neural network and, in response, receiving a second indication of a likelihood that the first or second frame includes at least a portion of an image of a human being, wherein the providing the indication that a human being is present or absent includes using the first indication of a likelihood that the third frame includes at least a portion of an image of a human being, and using the second indication of a likelihood that the first or second frame includes at least a portion of an image of a human being.

Aspect 8 can include or use, or can optionally be combined with the subject matter of Aspect 7, to optionally include differently weighting the likelihood indications from the first and second neural networks.

Aspect 9 can include or use, or can optionally be combined with the subject matter of one or a combination of Aspect 7 and Aspect 8, to optionally include applying the first frame or the second frame as an input to the second neural network includes applying information corresponding to the portion in which the change was identified and excluding information not corresponding to the portion in which the change was identified.

Aspect 10 can include or use, or can optionally be combined with the subject matter of one or any combination of Aspects 7 through 9, to optionally include selecting for use a first classification model from among multiple other classification models, and wherein the applying the first frame or second frame as an input to the second neural network includes using the second neural network with the selected first classification model.

Aspect 11 can include or use, or can optionally be combined with the subject matter of Aspect 10, to optionally include selecting the first classification model includes selecting a model that is trained using a priori information about the environment monitored by the camera.

Aspect 12 can include or use, or can optionally be combined with the subject matter of one or any combination of Aspects 7 through 11 to optionally include updating a classification model employed by the first or second neural network based on machine-learned information about successful and/or unsuccessful indications that the human being is present in or absent from the environment monitored by the camera.

Aspect 13 can include or use, or can optionally be combined with the subject matter of one or any combination of Aspects 7 through 12 to optionally include updating a classification model employed by the first or second neural network based on user-curated information about successful and/or unsuccessful indications that the human being is present in or absent from the environment monitored by the camera.

Aspect 14 can include or use, or can optionally be combined with the subject matter of one or any combination of Aspects 7 through 13 to optionally include the first and/or second neural network is further configured to provide facial recognition information about the human being when the human being is determined to be present in the environment.

Aspect 15 can include or use, or can optionally be combined with the subject matter of one or any combination of Aspects 7 through 14 to optionally include the first and/or second neural network is further configured to provide a count of a number of different human beings determined to be present in the environment.

Aspect 16 can include or use, or can optionally be combined with the subject matter of one or any combination of Aspects 1 through 15 to optionally include the identifying the difference between a portion of at least the first and second frames includes designating at least one of the first and second frames as a background frame and identifying a difference between the second frame and the background frame.

Aspect 17 can include or use, or can optionally be combined with the subject matter of one or any combination of Aspects 1 through 16 to optionally include the receiving the multiple frames from the camera includes receiving frames at a rate of less than about 100 ms.

Aspect 18 can include or use, or can optionally be combined with the subject matter of one or any combination of Aspects 1 through 16 to optionally include the receiving the multiple frames from the camera includes receiving frames at a rate of greater than about 500 ms.

Aspect 19 can include or use, or can optionally be combined with the subject matter of one or any combination of Aspects 1 through 18 to optionally include, when the processor circuit provides an indication that a human being is present in the environment, determining whether the human being is in a permitted or unpermitted location in the environment.

Aspect 20 can include or use, or can optionally be combined with the subject matter of one or any combination of Aspects 1 through 19 to optionally include generating a dashboard of information about the indication that a human being is present in or absent from the environment monitored by the camera, wherein the dashboard comprises an one or more of a dwell time indicator, a heat map indicating a location of the human being in the environment, or demographic indicator that includes demographic information about the human being.

Aspect 21 can include, or can optionally be combined with the subject matter of one or any combination of Aspects 1 through 20 to include or use, subject matter (such as an apparatus, a method, a means for performing acts, or a machine readable medium including instructions that, when performed by the machine, that can cause the machine to perform acts), such as can include or use a machine learning-based image recognition system for determining when human beings are present in or absent from an environment and reporting information about an occupancy of the environment over time. In an example, Aspect 21 can include a camera configured to receive a series of images of the environment, wherein each of the images is a different frame acquired at a different time and an image processor circuit. The image processor circuit can be configured to identify a difference between a portion of at least first and second frames acquired by the camera, the difference indicating movement by one or more objects in the environment monitored by the camera, and select a third frame from among the multiple frames for full-frame analysis, and apply the third frame as an input to a first neural network and in response receive a first indication that the third frame includes an image of at least a portion of a first human being. In an example, the image processor circuit can be configured to determine whether the first human being is present in or absent from the environment based on the identified difference and on the received first indication, and store information about the first human being in a memory circuit, the information including at least one of demographic information, dwell time information, or location information about the first human being.

Aspect 22 can include or use, or can optionally be combined with the subject matter of Aspect 21, to optionally include the camera comprises a portion of a sensor system that includes one or more of a fire sensor, smoke sensor, thermostat, glass break detector, contact sensor for a door or window, motion sensor, light switch, or smart speaker.

Aspect 23 can include or use, or can optionally be combined with the subject matter of one or any combination of Aspects 21 or 22 to optionally include or use a second processor circuit configured to receive information from the memory circuit about the first human being and other human beings detected in the environment using information from the camera, and generate a dashboard for presenting to a user the demographic information, dwell time information, or location information for the first human being and for the other human beings.

Aspect 24 can include or use, or can optionally be combined with the subject matter of Aspect 23, to optionally include the second processor circuit is configured to generate a dashboard with dwell time information that includes information about a queue length or queue location.

Aspect 25 can include or use, or can optionally be combined with the subject matter of one or any combination of Aspects 21 through 24 to optionally include or use a second camera configured to receive a series of images of a second environment, wherein each of the images is a different frame acquired at a different time, and wherein the image processor circuit is configured to determine whether the first human being is present in or absent from the second environment based on information from the second camera.

Aspect 26 can include or use, or can optionally be combined with the subject matter of one or any combination of Aspects 21 through 25 to optionally include or use a second camera configured to receive a series of images of a second environment, wherein each of the images is a different frame acquired at a different time, and a second processor circuit configured to receive information from the memory circuit about the first human being and receive information about one or more other human beings detected in images from the second camera, and generate a dashboard for presenting to a user information about the first human being together with information about the one or more other human beings.

Aspect 27 can include or use, or can optionally be combined with the subject matter of one or any combination of Aspects 21 through 26 to optionally include or use a second processor circuit configured to perform facial recognition to determine if the first human being is a recognized individual.

Aspect 28 can include, or can optionally be combined with the subject matter of one or any combination of Aspects 1 through 27 to include or use, subject matter (such as an apparatus, a method, a means for performing acts, or a machine readable medium including instructions that, when performed by the machine, that can cause the machine to perform acts), such as can include or use a machine learning-based image classifier system for determining whether a human being is present in or absent from an environment using neural network processing. In an example, Aspect 28 can include a first camera configured to receive a series of images of the environment, wherein each of the images corresponds to a different frame acquired at a different time, and an image processor circuit. In an example, the image processor circuit is configured to identify a difference between a portion of at least first and second frames acquired by the first camera, the difference indicating movement by an object in the environment monitored by the first camera, to select a third frame from among the multiple frames for full-frame analysis, to apply the third frame as an input to a first neural network and in response determine a first indication of a likelihood that the third frame includes at least a portion of an image of a first human being, and to provide an indication that a human being is present in or absent from the environment based on the identified difference and on the determined first indication of the likelihood that the third frame includes at least a portion of an image of the first human being.

Aspect 29 can include or use, or can optionally be combined with the subject matter of Aspect 28, to optionally include the first camera comprises a portion of a sensor system that includes one or more of a fire sensor, smoke sensor, thermostat, glass break detector, contact sensor for a door or window, motion sensor, light switch, or smart speaker.

Aspect 30 can include or use, or can optionally be combined with the subject matter of one or any combination of Aspects 28 or 29 to optionally include or use a second camera configured to receive a series of images of the same or different environment, wherein each of the images corresponds to a different frame, and a second processor circuit configured to generate a visual dashboard of information for presentation to a user about the first human being and about one or more other human beings recognized in the series of images from the second camera.

Aspect 31 can include or use, or can optionally be combined with the subject matter of one or any combination of Aspects 28 through 30 to optionally include the first camera configured to receive the series of images of the environment in a YUV color space, and wherein the image processor circuit is configured to identify the difference between a portion of at least first and second frames acquired by the first camera using only the Y information from the YUV color space, and wherein the image processor circuit is configured to apply only the Y information about the third frame from the YUV color space as the input to the first neural network.

Each of these non-limiting Aspects or examples can stand on its own, or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various examples discussed in the present document.

FIG. 7 illustrates generally an example of a two dimensional array with information about a cost function.

DETAILED DESCRIPTION

Figure 1:
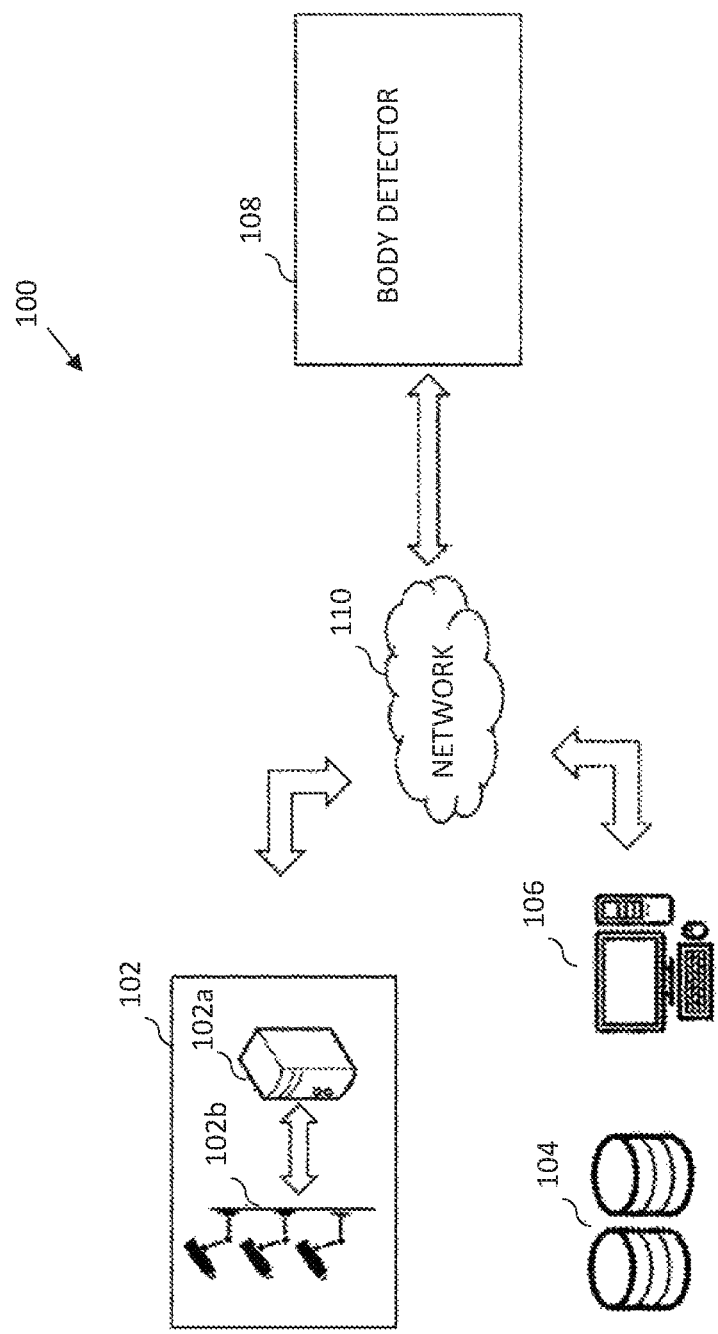
FIG. 1 illustrates generally an example of a system that can be used to receive and process image information.

This detailed description includes references to the accompanying drawings, which form a part of the detailed description. The drawings show, by way of illustration, specific examples in which the invention can be practiced. These examples are also referred to herein as "examples." Such examples can include elements in addition to those shown or described. However, the present inventors also contemplate examples in which only those elements shown or described are provided. The present inventors contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein."

Various algorithms can be employed by computers (devices, machines, systems, etc.) to automatically and accurately detect human bodies in images and/or videos. In an example, deformable part-based models of Histogram of Oriented Gradients (HOG) features, such as combined with latent Support Vector Machines (SVM) techniques, can be used to detect one or more individuals or human bodies in an image. Part-based human detection can be used to localize various body parts of an individual in an image. In an example, part-based detection uses root filters and part filters (discussed further below).

In an example, human detection using machines to analyze images includes model training and detection. Training can be an offline step where machine learning algorithms (such as a convolutional neural network, or CNN) are trained on a training data set to learn human and non-human forms from various images. Detection can use one or more machine learning models to classify human and non-human regions in an image or frame. In an example, the detection is performed using a pre-processing step of identifying potential regions for presence of a human and a post-processing step of validating the identified potential regions. In the detection step, part-based detectors can be used in the identified region(s) by a root filter such as to localize, or provide information about a location of, each human part.

In an example, filters and deformable part-based models or algorithms can be used together to model a human appearance more accurately and in a more robust manner. Various examples of the filters can include HoG or HoG-like filters. Models can be trained by a latent SVM formulation where latent variables usually specify an object of interest (e.g., a human in this case), such as including relative geometric positions of parts of a human.

In an example, a root filter can be trained for an entire human body and part filters can be separately trained within regions of different root filters using latent SVM techniques. In an example, a model includes root filters which cover the target object and part models that cover smaller parts of the target object. The part models in turn include their respective filters, relative locations and a deformation cost function. To detect a human in an image, an overall score can be computed for each root location, and higher relative score locations can be considered as candidate locations for the human or individual.

FIG. 1 illustrates generally an example of a system 100 that can be used to receive and process image information. The system 100 can include a real-time streaming system 102, a video/image archive 104, a computer system 106 and a body detector 108. The real-time streaming system 102 can include a video server 102a and multiple cameras 102b such as can be installed in the same location or different locations. Examples of such locations include, but are not limited to, homes, roads, parking spaces, garages, toll booths, outside residential areas, outside office spaces, outside public places (such as malls, recreational areas, museums, libraries, hospitals, police stations, fire stations, schools, colleges), and the like. The cameras 102b can include Closed-Circuit Television (CCTVs) cameras, High Definition (HD) cameras, non-HD cameras, handheld cameras, or any other video/image receiving unit. In an example, the video server 102a of the real-time streaming system 102 is configured to receive dynamic imagery or video footage from the cameras 102b, and transmit the associated data to the body detector 108. In an example, the video server 102a can maintain the dynamic imagery or video footage as received from the cameras 102b. In an example, the cameras 102b can have respective fixed fields of view or can be movable. In an example, at least one of the cameras 102b includes a camera with a 180 degree view sensor and the camera is mounted on a ceiling or wall. Images acquired by such a camera can be de-warped such as prior to further processing. Other 180 degree view or more limited field of view sensors can similarly be used.

In an example, the video/image archive 104 includes a data store that is configured to store recorded or archived videos or images or frames. The video/image archive 104 can include one or more local databases or remote databases such as can be centralized and/or distributed. In an example, the video/image archive 104 can store data using a cloud based scheme.

In an example, the computer system 106 is any computing device remotely located from the body detector 108, and is configured to store a plurality of videos/images in its local memory. In an example, the computer system 106 can be replaced by one or more of a computing server, a mobile device, a memory unit, a handheld device or any other similar device.

In an example, the functions of the computer system 106 and/or the body detector 108 can be implemented at or in firmware or software residing at or adjacent to any one or more of the cameras 102b. That is, circuitry or processors on-board one or more of the cameras 102b can be used to carry out the same or similar functions of the computer system 106 and/or of the body detector 108.

In an example, the real-time streaming system 102 and/or the computer system 106 can send data (input frames) to the video/image archive 104 for storage and subsequent retrieval. The real-time streaming system 102, the video/image archive 104, and the computer system 106 are communicatively coupled to the body detector 108 via a network 110.

In an example, the body detector 108 can be part of at least one of a surveillance system, a security system, a traffic monitoring system, a home security system, a toll fee system or the like. In an example, the body detector 108 can be a separate entity configured to detect human bodies. The body detector 108 is configured to receive data from any of the systems including the cameras 102b, the real-time streaming system 102, the video/image archive 104, the computing system 106, or a combination of these. The data can be in form of one or more video streams and/or one or more images or frames. If the data is in the in the form of video streams, then the body detector 108 converts each stream into a plurality of static images or frames before processing. If the data is in the form of image sequences, then the body detector 108 processes the image sequences and generates an output that can include information about, among other things, whether a person or individual was detected in the environment, activities occurring in the environment, or other information about what one or more objects that are determined to be present in or absent from the environment.

In an example, the systems and methods discussed herein can be extended to include or use other sensors at the edge. Such sensors can include, for example, (i) a PIR motion sensor, (ii) a thermostat, (iii) a fire or smoke alarm sensor, (iv) an access control device or card reader, (v) a door or entryway sensor, (vi) a garage or gate sensor, or others. In an example, such edge devices may not include an integrated or embedded camera or image sensor. However, the present systems can be used to augment such edge devices. For example, a camera and an image processor can be added or communicatively coupled to an edge device. The camera can capture images or videos at or near the edge device. In an example, camera activity or image sensing or recording can be triggered or initiated in response to information detected in an image or by an alert or other indication from another sensor.

In an example, a PIR motion sensor can sense motion or activity. Upon positive identification of the motion or activity, the PIR sensor can send a signal to a camera to begin receiving or recording images or video. The images or video can be processed, such as inside the sensor itself, to determine whether a human is present in or absent from the scene.

In an example, a processor circuit can be provided outside of a sensor. In this case, image or video information from the camera can be transmitted to the processor circuit for analysis, such as to determine whether a human being is present in a scene. In an example, such a processor circuit can be a home security panel or controller such as can be located remotely from the sensor such as in a different home or building.

In an example, the edge device-based human presence identification can be configured to provide various information. For example, a result of a human presence detection algorithm can be that (i) a single human is detected to be present in a scene; (ii) multiple human beings are detected to be present in a scene, or (iii) specific or known human being(s) are determined to be present in a scene, and information about the known human beings such as names or other characteristics can be determined.

In an example, the body detector 108 is configured to process one or more received images (or frames of video data) and executes various techniques for detecting a presence of a human body. In an example, the body detector 108 first processes each of multiple received images to identify one or more regions that are likely to include a human figure or that include candidate humans. Next, the body detector 108 can identify a root of a body in the one or more regions such as using root filters. Next, the body detector 108 can be used to identify one or more body parts of a detected body based on, e.g., pair-wise constraints. The body parts can be detected using one or more body part detectors as discussed elsewhere herein. The body detector 108 can calculate scores for the various detected body parts and calculate an overall score based on one or more scores associated with the body parts. The overall score can correspond to a confidence that a human or individual is identified in the scene, as opposed to another non-human object. While performing human detection, the body detector 108 can be configured to consider occlusion, illumination or other conditions.

In an example, the network 110 can be any wired network, wireless network, a combination of wired or wireless networks. In an example, the network 110 includes a LAN or wireless LAN, the Internet, a point-to-point connection, or other network connection and combinations thereof. The network 110 can be any other type of network that transmits or receives data, such as from personal devices, telephones, video/image capturing devices, video/image servers, or any other electronic devices. In an example, the network 110 is configured to transmit or send data between the mentioned devices or others. The network 110 can be a local, regional, or global communication network, for example, an enterprise telecommunication network, the Internet, a global mobile communication network, or any combination of similar networks. The network 110 can be a combination of an enterprise network (or the Internet) and a cellular network, in which case, suitable systems and methods are employed to seamlessly communicate between the two networks. In such cases, a mobile switching gateway can be used to communicate with a computer network gateway to pass data between the two networks. The network 110 can include any software, hardware, or computer applications that can provide a medium to exchange signals or data in any of the formats known in the art, related art, or developed later.

Figure 2:
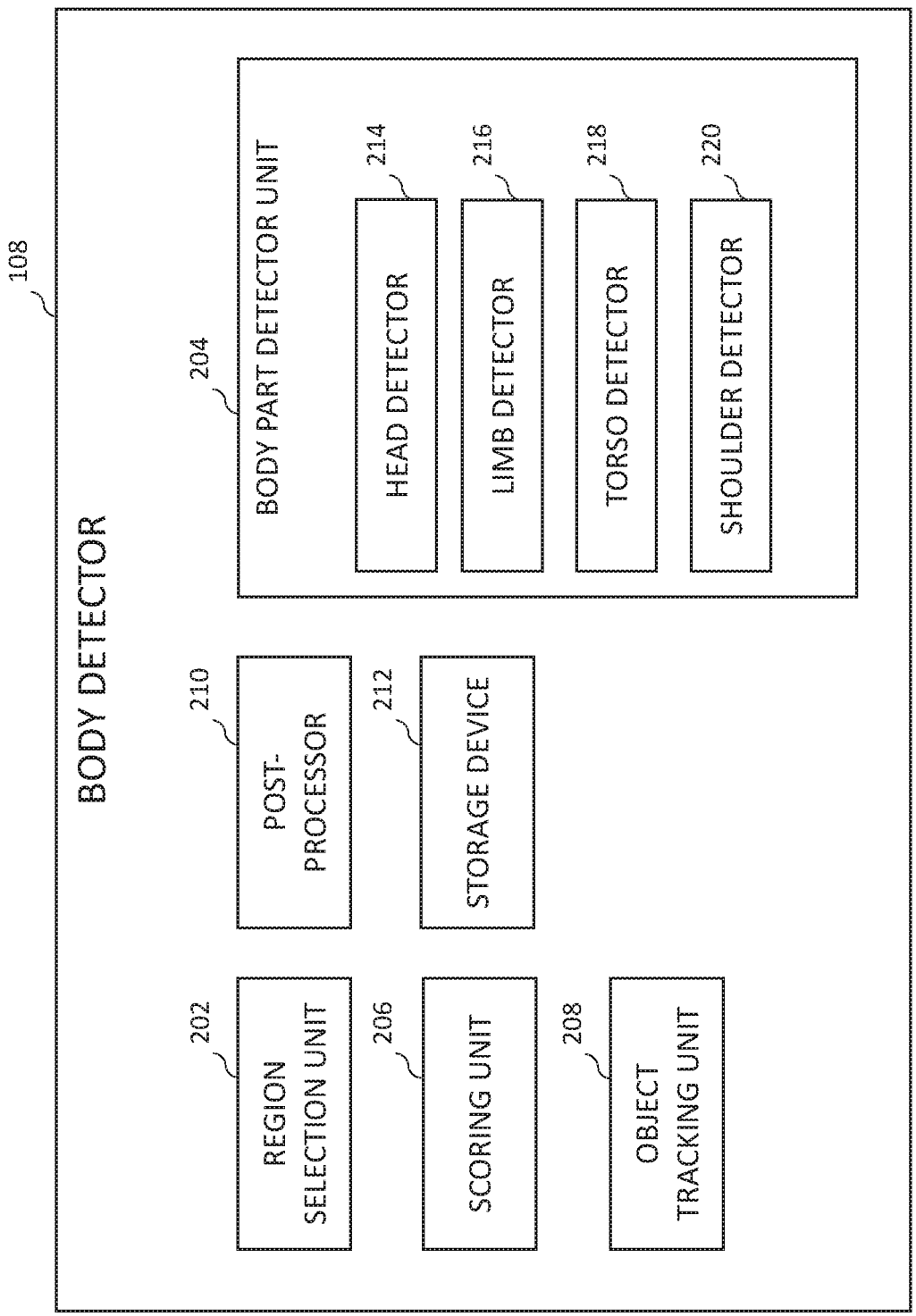
FIG. 2 illustrates generally an example of a body detector and various submodules thereof.

FIG. 2 illustrates generally an example of the body detector 108 and various submodules thereof. In the example of FIG. 2, the body detector 108 includes a region selection unit 202, a body part detector unit 204, a scoring unit 206, an object tracking unit 208, a post-processor 210 and a storage device 212. The body part detector unit 204 can further include a head detector 214, a limb detector 216, a torso detector 218, a shoulder detector 220, or other modules configured to detect various features or aspects of a human figure.

Figure 3:
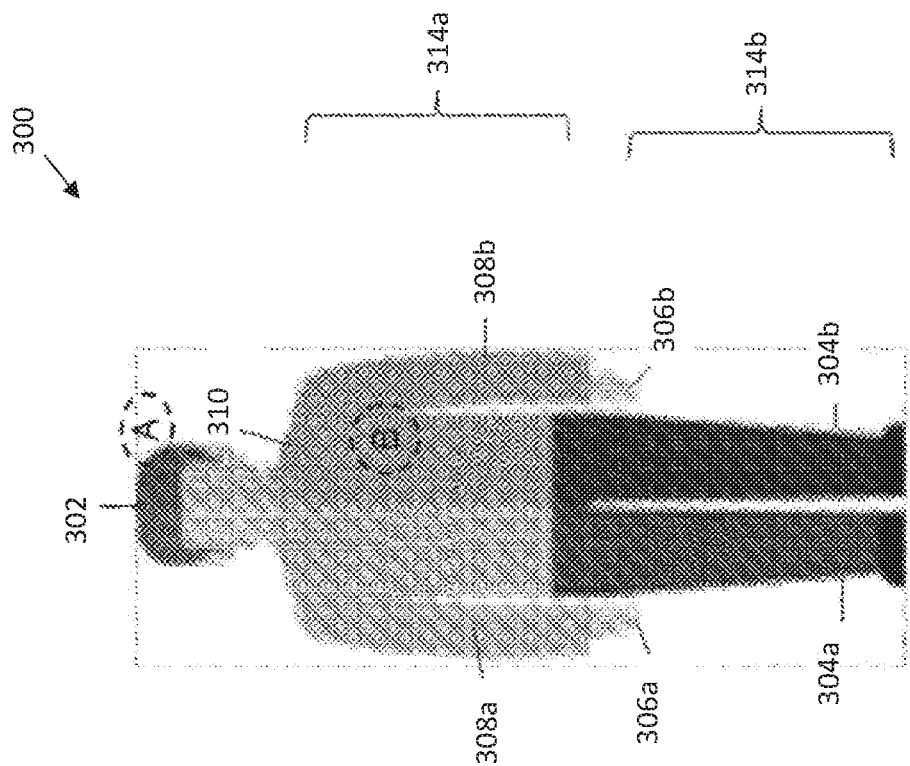
FIG. 3 illustrates generally an example of a human body or individual with various body parts, such as can be observed by one or more cameras.

FIG. 3 illustrates generally an example of a human body or individual 300 with various body parts, such as can be observed by one or more of the cameras 102b. The individual 300 has a head 302, legs 304a and 304b, hands 306a and 306b, arms 308a and 308b, shoulders 310, and limbs 314a and 314b. In an example, the body detector 108 is configured to identify or recognize one or more of the body parts of the individual 300.

Referring again to FIG. 2, in an example, the body detector 108 includes an input unit to receive an image input, such as frame-based image data. In an example, the input unit receives image information from one or more systems including the real-time streaming system 102, the video/image archive 104 and the computer system 106. The input unit can receive a video stream instead of an image and the video stream can be divided into a sequence of frames. In an example, the body detector 108 is configured to remove noise from a received frame before further processing. The frames can be received by the body detector 108 automatically at pre-defined intervals or irregularly. For example, the body detector 108 can receive frames every 1 hour or twice a day. In an example, frames can be received in response to a user or system request.

In an example, images are captured in real-time by the cameras 102b, and the images can be stored in the video/image archive 104 or the computer system 106. The images as received can be in any suitable formats for data analysis. The image can include objects such as human bodies, cars, trees, animals, buildings, any articles and so forth. Further, the images can include one or more regions that include non-human objects. Generally, regions that include or that may include a human body is referred to herein as a candidate region. A frame or image can have zero, one, or multiple candidate regions. In an example, a candidate region comprises all or a portion of a frame. That is, the candidate region can correspond to an entire field of view or less than an entire field of view.

In an example, the region selection 202 unit is configured to select one or more candidate regions from the one or more of regions in a frame based on a pre-defined threshold. The pre-defined threshold can indicate a probability of finding a human body, or a portion or part of a human body, in a region of the frame. In an example, candidate regions can include bounding boxes that are generated using machine learning-based detector algorithms. These algorithms run efficiently, quickly, and generate candidate regions with false positives that can generally be eliminated through further or more intensive processing.

In an example, the region selection unit 202 executes a region selection algorithm to select one or more candidate regions. The region selection algorithm can be biased to provide a low number of false negatives, meaning if a region includes a human, there is very low probability that the region will be rejected. In an example, the region selection algorithm can be biased to provide a high number of false positives, meaning if a region does not have a human, then the region can be selected. Various algorithms can be used for candidate region selection such as motion-based algorithms, simple HOG and SVM-based algorithms, and foreground pixels detection-based algorithms. After the one or more candidate regions are selected, then the selected regions can be provided to the body part detector unit 204 for further processing.

In an example, the body part detector unit 204 is configured to detect a human body in a candidate region of the one or more candidate regions based on a set of pair-wise constraints. The body part detector unit 204 can perform parts-based detection of the human body such as to identify a head, limbs, arms, legs, shoulder, torso, and/or hands. In an example, the body part detector unit 204 includes a set of body part detectors for detecting respective parts of the body. For example, the body part detector unit 204 includes the head detector 214, the limb detector 216, a torso detector, a leg detector, an arm detector, a hand detector, or the shoulder detector 220. As evident from the names, the head detector 214 is configured to detect a head of a human body, the limb detector 216 is configured to detect upper or lower limbs of a human body, and so on.

In an example, the body detector 108 and/or the body part detector unit 204 includes or uses deep Convolution Neural Networks (CNN) to process image or frame data and provide an indication or classification of the information in the image or frame as comprising a body part or being a specific body part. In an example, a neural network used herein for human body detection or analysis can use ResNet or DenseNet architectures, or others. The network can be configured to incorporate or use motion information, such as by analyzing information from multiple image frames over time, to provide a result with information about a presence or absence of a human body in a frame. In an example, the network can be configured to use angle or depth information about a candidate object in its determination or classification algorithms.

The neural networks discussed herein and the models employed in such networks can be trained using various data sources. For example, specific training data that corresponds to an end application or end user can be used to train the model employed by the network. The models can be specific to different use cases or environments or can be more general. In an example, a semi-supervised (semi-manual) process can be used to import learning data.

The neural networks discussed herein can be tuned to maximize power efficiency, such as using fixed-point calculations using weighted or output-quantized nodes. Generally, a network library footprint can be about 1 MB or less of data, however larger library files can be used when more resources (power, processing time) are available. Memory buffers used to perform the neural network-based analysis can be used and reused, that is, the buffers can be swapped throughout execution and are allocated only on demand. In an example, auxiliary hardware and accelerators can be used, such as to perform specific tasks like CV functions, matrix multiplication, CNN execution, and more.

In an example, the body part detector unit 204 detects a first body part at a first location in a candidate region using a first body part detector of the set of body part detectors. The first body part can be considered a root of a body, for example, a head of the body. The body part detector unit 204 further detects a second body part at a second location in the candidate region using a second body part detector of the set of body part detectors. The second body part detector is selected from the set of body part detectors, and can be based on a pair-wise constraint. The pair-wise constraint can be determined based on a relative location of the second location with respect to the first location.

In an example, it can be considered that a head is a root of a detected body, and thus, the head is the first body part that gets detected using the head detector 214. Assume the head is located at a first location A. The body part detector unit 204 selects a second body part which is relatively located at a second location B some distance apart from the first location A (see A and B depicted in the example of FIG. 3). In an example, the second body part includes a limb or shoulder.

In an example, the body part detector unit 204 is not required to implement or use each of multiple available detectors, however, a decision of whether to apply one or more of the various available detectors can be condition-based. For example, the head detector 214 can be run first and if the head is detected, then other body part detectors 216-220 can be run in appropriate regions, or portions of a frame, relative to the detected head region. The condition-based implementation helps reduce a number of times the detectors are applied and can reduce processing time and power consumption. Further, a conditionally-applied body parts-based network of classifiers helps reduce a size of the network and provides better performance as compared to a full body/person-based classification network. Following identification of the first and second parts such as at the locations A and B, information about the detected first body part and the second body part can be provided to the scoring unit 206 for further processing.

In an example, the scoring unit 206 can be configured to compute a score for a candidate region based on at least one of a first score and a second score. The first score corresponds to a score of the first body part, while the second score corresponds to a score of the second body part. The first score can be determined based on the detection of the first body part at the first location and the second score can be determined based on the detection of the second body part at the second location. Based on the first score and the second score, an overall score is computed for the detected human body by the scoring unit 206. In an example, the overall score can be a summation of the first score and the second score. In another example, the overall score can be a weighted summation of the first score and the second score. In an example, the body part detector unit 204 can further implement one or more other body part detectors, such as the torso detector 218 or the shoulder detector 220, until a complete or entire human body is detected. Based on the detected body parts, an overall score can be computed.

In an example, the object tracking unit 208 can be configured to track a body, or candidate region, across multiple frames. The tracking can be performed using techniques such as a MeanShift technique, an Optical Flow technique, a bounding box estimation technique, or other technique. In an example, a detected body can be tracked using the information contained in the current frame and one or more other adjacent (e.g., preceding or subsequent) frames. An object association or correspondence can be determined or provided for the detected objects in the different frames. In an example, a bounding box estimation process is executed, and the bounding box (or other shape containing the object) of an object in a current frame is compared with a bounding box in a previous frame(s) and a correspondence between the objects and/or bounding boxes to establish a cost function. The bounding box techniques can represent region and location information for an entire body or less than an entire body.

In an example, feature or model-based tracking can be used. According to this example, a pair of objects that includes a minimum value in a cost function can be selected by the object tracking unit 208. A bounding box of each tracked object can be predicted based on maximizing a metric in a local region. The prediction can be made using techniques such as, but not limited to, optical flow, mean shift, and/or dense-sampling search, and can be based on features such as HOG color, Haar features, and the like.

In an example, when object tracking processing is complete, the object tracking unit 208 communicates with the post-processor 210 for further steps. The post-processor 210 can be configured to validate a detected body in the candidate region. The body can be validated based on at least one of a depth, a height and an aspect ratio of the body. In another example, the validation can be performed based on generic features such as color, HoG, SIFT, Haar, LBP, and the like. In an example, the validation can be performed using a region in a particular frame, using respective regions in multiple frames, or using full-frame analysis.

In an example, the storage device 212 can include a training database including pre-loaded human images for comparison to a received image (e.g., image information received using one or more of the cameras 102*b*) during a detection process. The training database can include images of humans in different positions and can include images of humans having different sizes, shapes, genders, ages, hairstyles, clothing, and so on. In an example, the images can be positive image clips for positive identification of objects as human bodies and can include negative image clips for positive identification of objects as non-human bodies.

In an example, the body detector 108 and/or components thereof can be provided in the form of hardware components or software entities or modules that can be implemented using a generic or purpose-built processor. In an example, the body detector 108 can be included in hardware or firmware of a camera used to receive the image data, or can be included in a local or remote processing system. In an example, the body detector 108 can be a part of at least one of a mobile phone, a computer, a server, or a combination thereof.

Various algorithms, components, and processes for implementing human detection are discussed in U.S. Patent Application Publication No. 2017/0213081 ("the '081 publication"), titled "Methods and systems for automatically and accurately detecting human bodies in videos and/or images", which is hereby incorporated herein by reference in its entirety. Any one or more of the different algorithms, components, and processes in the '081 publication can similarly be applied in the context of the present application for the same or similar purpose of human identification in an image. For example, the '081 publication discusses using a Directional Weighted Gradient Histogram (DWGH) for detecting a human body in an image (see the '081 publication at FIG. 4). The DWGH scheme can be used to provide better discrimination between positive and negative images. The '081 publication discusses using Latent Support Vector Machines (SVM) variables to improve detection accuracy. The '081 publication discusses enhancing processing speed and reducing false positives by using regions of detected motion and object tracking across frames. In FIG. 5, the '081 publication illustrates an exemplary method flowchart for detecting a body in an image based on a machine learning model including using deformable parts-based models for detecting human bodies, such as where one or more features are extracted for each part and are assembled to form descriptors based on pair-wise constraints.

Referring again to FIG. 2, the body detector 108 can be implemented in whole or in part at or in hardware or software at or adjacent to a camera, such as in one or more of the cameras 102b. In an example, such implementation at a camera can be referred to as edge processing or edge-based processing. In an example, edge processing at a camera can be performed using machine learning models that are trained to work with image in a YUV color space. In an example, edge processing can be performed using machine learning models that are trained to work exclusively on one element of a color space, such as using Y information only from a YUV color space. That is, in an example, color or chrominance information can be disregarded and brightness or luminance information can be used for image recognition processing. In an example, with less than all of YUV information being used by a processor, higher resolution analysis can be performed in a shorter amount of time or using fewer cycles than if all of the YUV information is used together.

Figure 4:
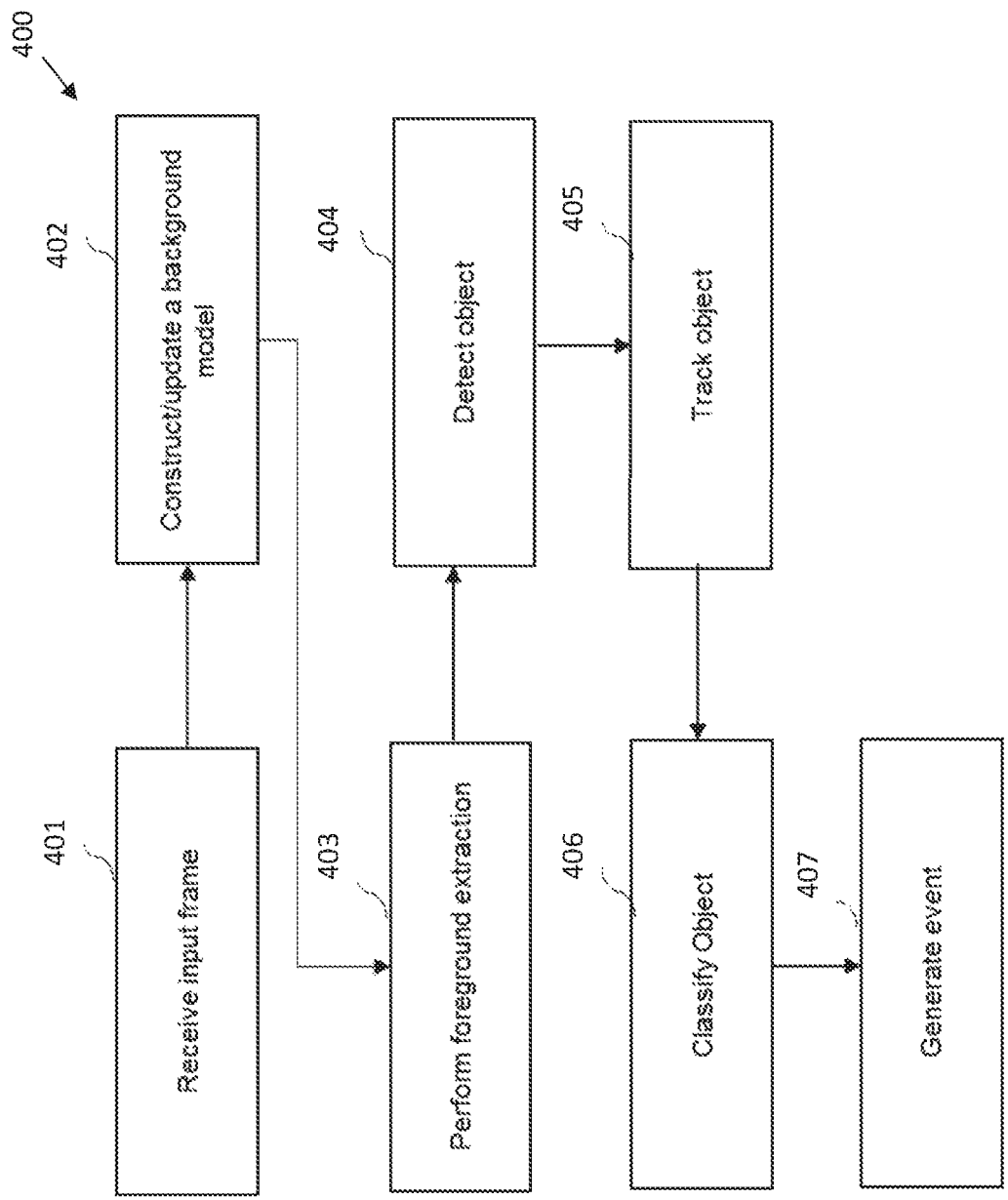
FIG. 4 illustrates generally an example of a method that includes detecting and tracking an object using information from a camera.
Figure 5:
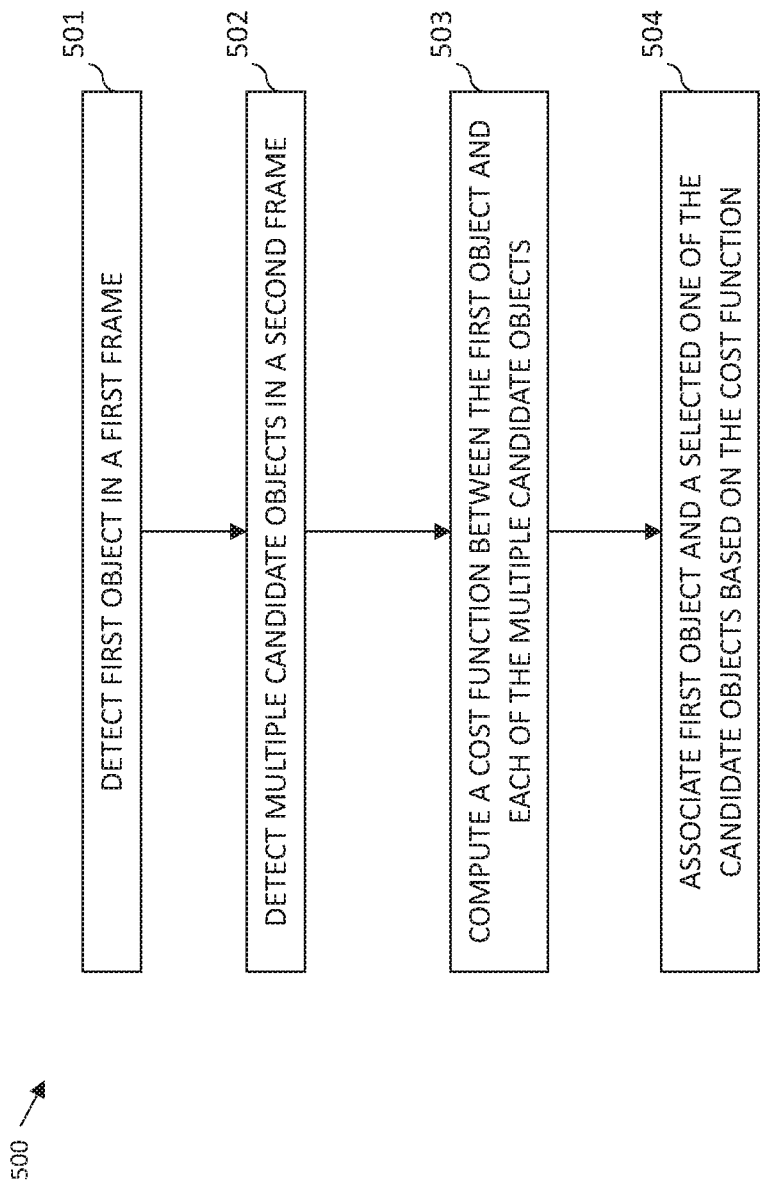
FIG. 5 illustrates generally an example of a method that includes using a cost function to make associations between different candidate objects identified in an image or in a series of images.

FIG. 4 illustrates generally an example of a method 400 that includes detecting and tracking an object using information from a camera. At step 401, the method 400 includes receiving an input frame such as comprising still image information from a camera. In an example, step 401 includes receiving a series of discrete frames over time, such as can be received periodically at regular intervals or at irregular intervals, such as in response to an external trigger, such as from a motion sensor, audio sensor, or other input.

Figure 6:
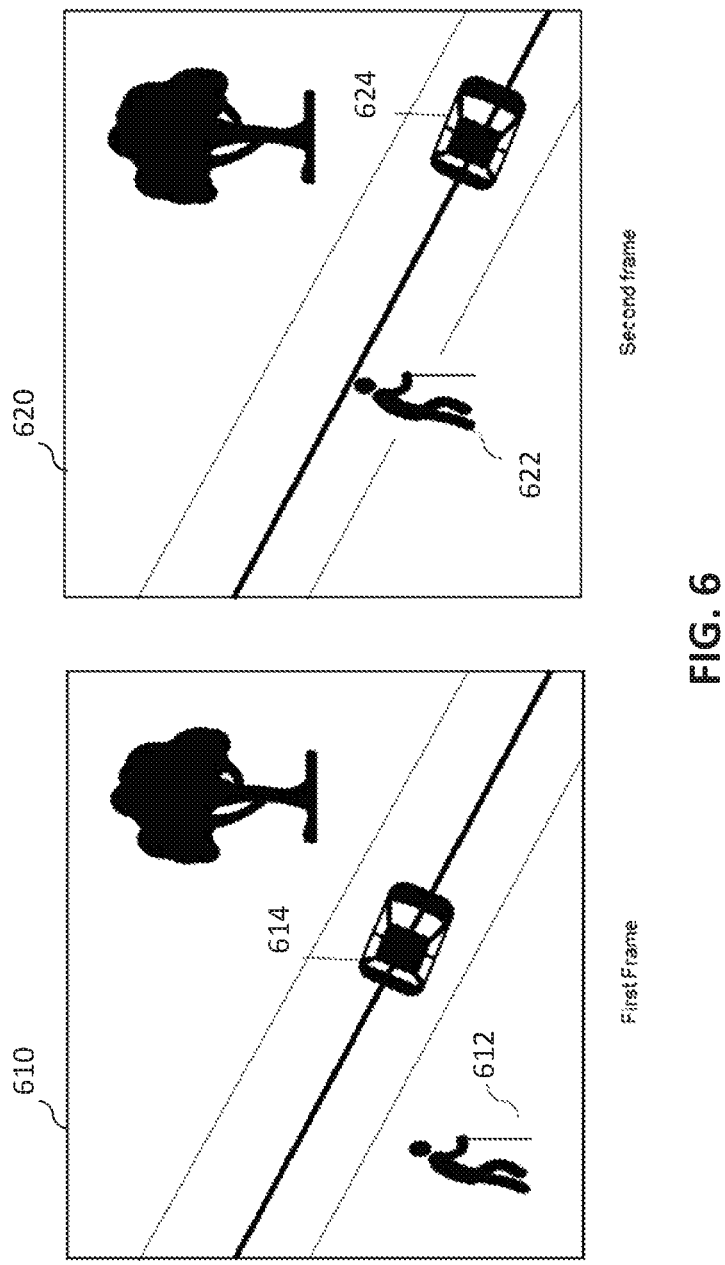
FIG. 6 illustrates generally an example of time-adjacent frames from a camera.

Various aspects of the method 400 are illustrated with reference to FIG. 6. FIG. 6 illustrates generally an example of time-adjacent frames from a camera, including a first frame 610 and a subsequent second frame 620. The first frame 610 includes a tree object at a first location, a human object at a second location 612, and a vehicle object at a third location 614. Any one or more of the objects can comprise a portion of a target area of the environment or scene represented in the frames.

Referring again to FIG. 4, at step 402, the method 400 can include constructing or updating a background model. In an example, a background model can include or use information about one or more features of an environment that is monitored by the camera. In an example, the one or more features can be static features (such as a large tree trunk, a building, or other fixed article in a field of view of the camera) or can be features that change position or location over time (such as tree leaves) In an example, step 402 can include analyzing the first frame 610 and/or the second frame 620 and determining that the tree object at the first location is a static object and that it can be considered part of a background. In an example, a street object can similarly be determined at step 402 to form a portion of a background. In an example, step 402 can include automatic scene learning to understand sizes and shapes of various objects. In an example, the method can be configured to learn locations where objects of specific classes can or cannot appear.

At step 403, the method 400 can include foreground extraction. Step 403 can include or use a processor circuit, such as including the body detector 108, to identify features of interest in the input frame received at step 401. Step 403 can include recognizing motion or movement of one or more objects in time-adjacent frames and then designating such objects as belonging to a foreground.

Step 404 can include detecting one or more objects in the input frame and/or in the foreground identified at step 403. In an example, step 404 includes identifying discrete objects or regions in an image and flagging such objects for further analysis. For example, step 404 can include identify a tree object, a human object, a street object, and/or a vehicle object in one or more of the first and second frames 610 and 620.

The method 400 can optionally include, at step 405, tracking the one or more objects that were detected at step 404. For example, step 405 can include monitoring a travel path or direction of an identified human object such as using information from multiple time-adjacent frames, such as received from the same camera or from different cameras. With reference to FIG. 6, for example, the human object is at the second location 612 in the first frame 610 and the human object is at a fourth location 622 in the second frame, and thus the human object can be determined to be moving. Similarly, the vehicle object is at the third location 614 in the first frame 610 and the vehicle object is at a fifth location 624 in the second frame 620, and thus the vehicle object can be determined to be moving.

In an example, steps 402-405 can include or use adaptive thresholding for pixel-based analysis, and uses information about pixel changes or variation over time to identify object motion or trajectory. In an example, steps 402-405 can include or use information about near frame differences and far frame differences. In near frame distances, time-adjacent frames are used, or frames separated by relatively short duration intervals, such as a few milliseconds, are used. In far frame distances, frames separated by longer intervals can be used, such as intervals lasting tens to hundreds of milliseconds. In an example, information determined about short term motion, such as motion occurring within a few hundred milliseconds or less, can be combined with information determined about longer term motion, such as motion occurring within about a half second or more. The combination of short and long term motion information can be useful to filter out motion "noise" such as due to blinking lights, fans, or other movements that can generally be discarded when the objective is to identify humans in an environment.

The method 400 can include, at step 406, classifying an object that was detected at step 404. Classifying the object can include or use a processor circuit to implement a machine learning-based classifier or algorithm to classify the detected objects and optionally to identify different characteristics of the objects. For example, a classifier can be configured to identify or discriminate human objects from pets or other moving objects. The same or another classifier can be configured to perform facial recognition or demographic feature recognition on identified human objects. At step 407, the method can include generating an event using information about the object, such as information about an object path from step 405, or information about a class to which the object belongs from step 406. In an example, step 407 includes storing information about the event in a database.

FIG. 5 illustrates generally an example of a method 500 that includes using a cost function to make associations between different candidate objects identified in an image or in a series of images. At step 501, the method 500 can include detecting an object in a first frame. The first frame can include information received from a first camera, such as one of the cameras 102b. In an example, detecting the first object can be performed using foreground extraction techniques, using information about detected movement or changes between time-adjacent frames (that is, frames received at different but temporally near times), or using a neural network-based classifier to analyze all or a portion of one or more frames and provide information about one or more objects or candidate objects in the first frame.

At step 502, the method 500 can include detecting multiple candidate objects in a second frame. The second frame can include information received from the same first camera as used to receive the first frame, or the second frame can include information received from a different camera. The second camera can be configured to monitor the same environment as that environment monitored by the first camera but from a different angle or having a different field of view. In an example, the first and second cameras monitor different environments. The candidate objects in the second frame can be detected using the same or different processing techniques than were used to identify the first object in the first frame.

At step 503, the method 500 can include computing a cost function between the first object and each of the multiple candidate objects from the second frame. In an example, the cost function can be based on a visual similarity or dissimilarity between the first object and the candidate objects. The visual similarity or dissimilarity can be based on, among other things, object shape, size, trajectory, color content, or other characteristics that can be derived from image data. In an example, the cost function can additionally or alternatively be based on a physical distance between the first object and the candidate objects. In an example, the cost function can additionally or alternatively be based on a difference between an expected location of the first object in the second frame relative to the location(s) of the candidate objects. Values corresponding to the cost functions can be computed and stored, such as in a two dimensional array in a memory circuit. An example of a two dimensional array that includes cost function information is illustrated generally in FIG. 7. The cost function information in FIG. 7 is arranged in a matrix or grid of columns C1 through C4 and rows R1 through R4. In an example, the various row-column pairs correspond to different regions of an image. For example, the value V_10 in cell (R1, C1) can indicate a high or maximum cost for a first region, whereas the value V_2 in cell (R4, C2) can indicate a relatively low or minimal cost for a second region. In an example, an object associated with the information in lower-valued cells can be considered to more be more closely associated with the target or original object, that is, such objects corresponding to the lower-valued cells can be more likely to be the same as or related to an object of interest such as in a preceding frame.

In an example, at step 504, a processor circuit such as the body detector 108 can select one or more pairs of the first object with the various candidate objects and, using the cost function information, can associate the first object with selected ones of the candidate objects. A relative value of the cost function can be used to provide an indication of a confidence or a likelihood that the first object is the same as one or more of the candidate objects.

Figure 8:
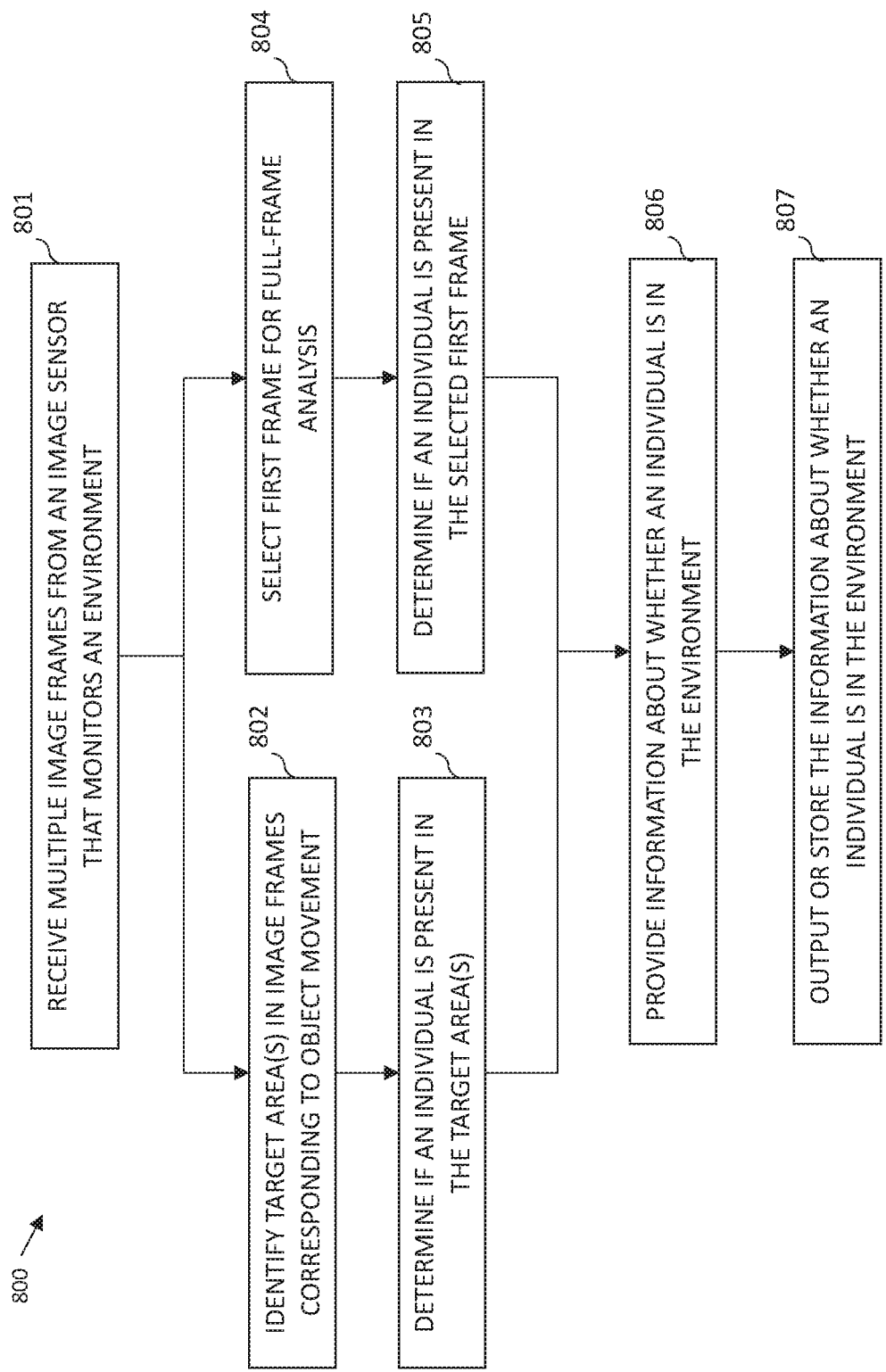
FIG. 8 illustrates generally an example of a method that can include determining whether an individual, or human object, is present in a monitored environment.

FIG. 8 illustrates generally an example of a method 800 that can include determining whether an individual, or human object, is present in a monitored environment. At step 801, the method 800 includes receiving multiple frames from an image sensor, or camera, that monitors an environment. In an example, the multiple frames are provided by the same camera or by different cameras. In an example, the frames are received by the body detector 108.

At step 802, the method 800 can include identifying one or more target areas in the frames received at step 801. The target areas can be areas or regions in a frame that include objects at rest or objects in motion. In an example, the target areas can be predefined by a user or can be determined by a processor, such as using machine learning to determine or identify areas in frames that include objects in motion or are more likely to include objects in motion than other areas in the same frames. In an example, step 802 includes motion extraction processing, foreground/background processing, or machine learning-based analysis, such as using a neural network with a human classification model, to determine whether a frame or frames include an object in motion.

At step 803, the method 800 can include determining if an individual, or human being, is present in the target areas identified at step 802. Step 803 can include using the body detector 108 to apply a neural network-based first classifier, such as a classifier that is trained on data about various human or body shapes or body parts. The first classifier can be applied using, or can receive input data that corresponds to, image information from the target areas identified in step 802. In this manner, less than an entire frame of information can be processed by the classifier, thereby saving time and processing cycles and power. That is, information from the target areas identified at step 802 can be provided to a classifier that is trained to recognize human bodies, or parts of human bodies, and the classifier can provide a first indication about whether an individual is present in the target area of the environment.

The method 800 can include, at step 804, selecting a first frame for full-frame analysis. Step 804 can include selecting the first frame from among the multiple frames received at step 801 or can include selecting a different frame. In an example, step 804 includes selecting one of the frames used in steps 802 and/or 803 to identify the target areas and/or to determine whether an individual is present in the frame. At step 805, the method 800 can include determining if an individual, or human being, is present in the first frame (e.g., a full frame of image data) that was selected at step 804. Step 805 can include using the body detector 108 to apply a neural network-based second classifier, such as a classifier that is trained on data about various human or body shapes or body parts. The second classifier can be applied using, or can receive input data that corresponds to, image information from more than a target area (such as identified at step 802) and can optionally include using image information corresponding to an entire frame. In an example, specifically selected frames can be processed, without regard to detected areas of motion, to determine or confirm human object presence in the environment. Different models or classification algorithms can be applied depending, for example, on a compute power available in a camera to optimize performance and depending on detection accuracy required, such as can be view-angle dependent.

At step 805, the information from the first frame is provided to the second classifier and the second classifier is trained to recognize human bodies, or parts of human bodies, and provide a second indication about whether an individual is present in the environment. In an example, the first classifier used in step 803 and the second classifier used in step 805 are the same classifier, such as the same neural network-based classifier, such as using or applying the same classifier model(s). In an example, the first classifier used in step 803 is different from the second classifier used in step 805, for example, one or the other classifier can be more sensitive or can provide a greater confidence that the image information includes an individual. In an example, one of the first and second classifiers includes a limb or extremity detector unit while the other of the classifiers includes only a more generic or higher level body or blob detector.

At step 806, the method 800 includes providing information about whether an individual is in the environment monitored by the camera. The information can include a confidence that is determined using the first indication and the second indication provided at steps 803 and 805, respectively. In an example, the first and second indications can be differently weighted, such as according to a sensitivity or confidence provided by the respective classifier models used at steps 803 and 805. Step 807 can include outputting or storing the information about whether the individual is present in the environment. For example, stored information about the individual can be later recalled or collected to provide a dashboard with information about a detected individual, or about multiple detected individuals over time, such as dwell time information, queue length information, demographic information, or other details about the individual or about the environment that includes the individual.

Figure 9:
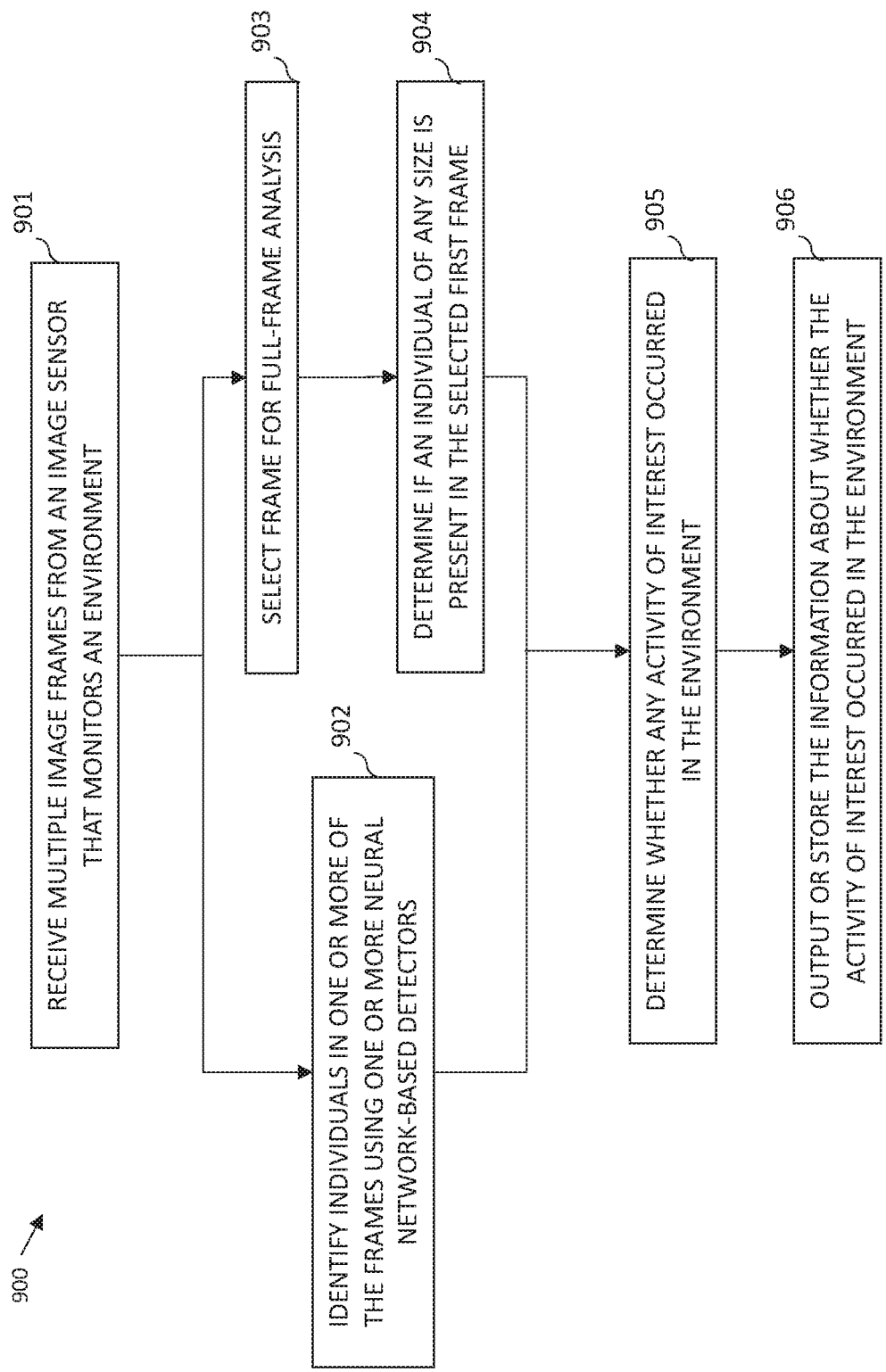
FIG. 9 illustrates generally an example of a method that can include determining whether an activity of interest is observed in a monitored environment.

FIG. 9 illustrates generally an example of a method 900 that can include determining whether an activity of interest is observed in a monitored environment. At step 901, the method 900 includes receiving multiple frames from an image sensor, or camera, that monitors an environment. In an example, the multiple frames are provided by the same camera or by different cameras. In an example, the frames are received by the body detector 108.

At step 902, the method 900 can include determining if an individual, or human being, is present in one or more of the frames received at step 901, such as using one or more neural network-based classifiers, such as including a classifier that is trained on data about various human or body shapes or body parts. In an example, step 902 is performed in whole or in part using the body detector 108. The classifier can be applied using, or can receive input data that corresponds to, image information from target areas of the frames (see, e.g., FIG. 8 at step 802) or can include image information for all of the frame, to provide an indication about whether individuals are present in the environment.

The method 900 can include, at step 903, selecting a first frame for full-frame analysis. Step 903 can include selecting the first frame from among the multiple frames received at step 901 or can include selecting a different frame. In an example, step 903 includes selecting one of the frames used in step 902. At step 904, the method 900 can include determining if an individual, or human being, is present in the first frame that was selected at step 903. Step 904 can include using the body detector 108 to apply a neural network-based classifier, such as a classifier that is trained on data about various human or body shapes or body parts. At step 904, the information from the first frame is provided to the second classifier and the classifier is trained to recognize human bodies, or parts of human bodies, and provide a second indication about whether an individual is present in the environment. In an example, the classifiers used in step 902 and in step 904 can be the same classifier or different classifiers. In an example, the classifiers can have different sensitivities, can test for or identify different body types, shapes, or parts, or can be configured to provide different levels of confidence that the image information includes an individual.

At step 905, the method 900 includes determining whether activity of interest occurred in the environment. In an example, the activity of interest can be a presence of absence of a particular individual (see, e.g., step 806 that describes using results from different neural network-based classifiers to determine whether an individual is present in an environment). In an example, the activity of interest can be an activity performed by an individual, such as an individual being present in a particular portion of an environment (e.g., in a prohibited area) or an individual performing suspicious acts (e.g., opening a window or door to a restricted area).

Step 906 can include outputting or storing the information about whether the activity of interest occurred in the environment. For example, stored information about the an individual or activity can be later recalled or collected to provide a dashboard with information about a detected individual, or about multiple detected individuals over time, or about activities that transpired in the environment.

Figure 10:
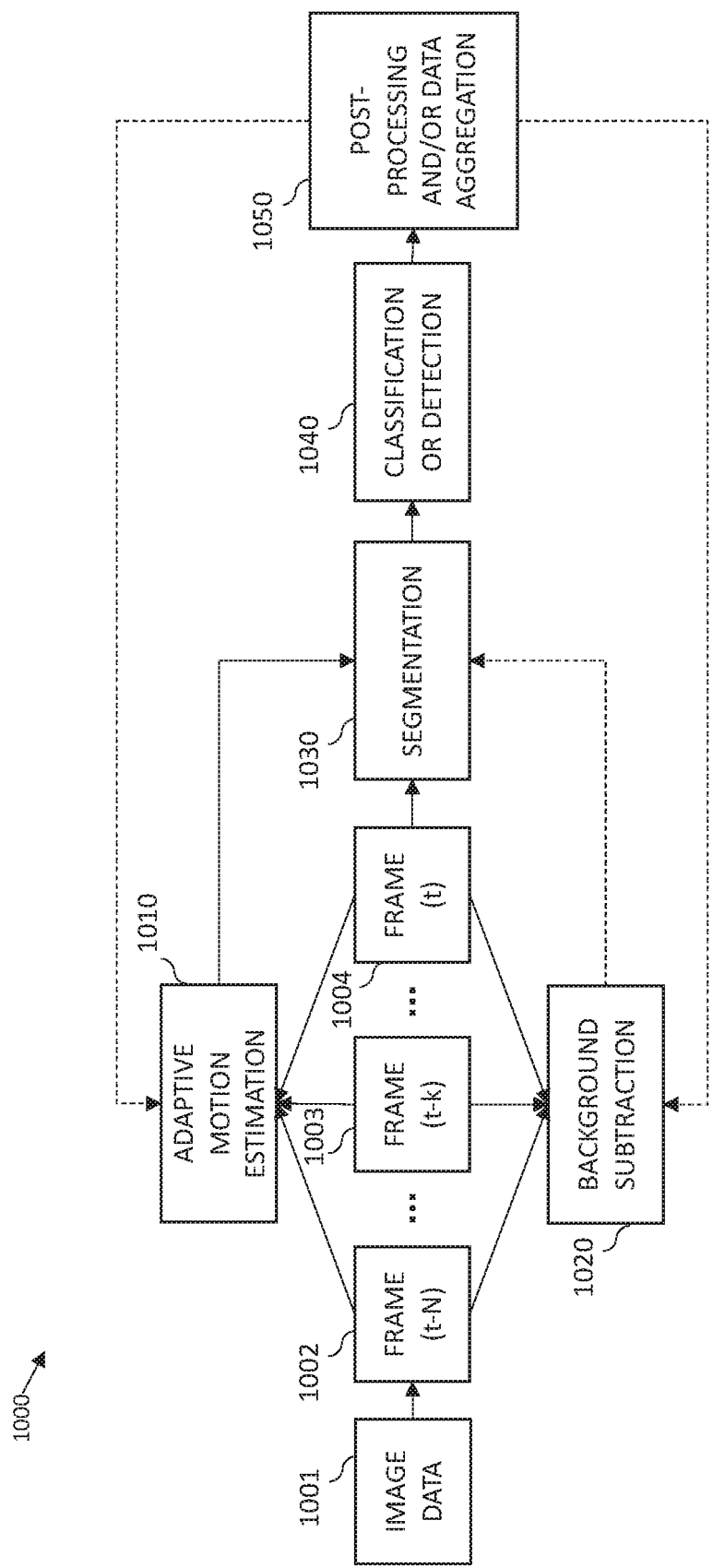
FIG. 10 illustrates generally an example of a schematic diagram that shows frame processing for use in human detection.

FIG. 10 illustrates generally an example of a schematic diagram 1000 that shows frame processing for use in human detection. In an example, the system 100 can be configured to perform the various steps and logical blocks illustrated in the diagram 1000.

At block 1001, image data can be acquired by a camera, such as by one or more of the cameras 102*b*. The image data can include a series of frames including a first frame 1002, a second frame 1003, and a third frame 1004. The series of frames can include frames received over a period of time and the same or different duration can elapse between acquisition of each frame.

Information from the series of frames can be provided to an adaptive motion estimation block 1010 and/or to a background subtraction block 1020. In the adaptive motion estimation block 1010, such as can be implemented by the body detector 108 and/or by another image processor circuit, any two or more of the frames from the series can be analyzed to determine if one or more objects in the frames represent, or are likely to represent, objects in motion. In the background subtraction block 1020, such as can be implemented by the body detector 108 and/or by another image processor circuit, the frames can be processed to subtract or remove background information. The background information can be predefined or known a priori by the system, or the background information can be determined by machine analysis of a series of frames to identify portions of the images that do not change, such as over long periods of time. In an example, one or both of the adaptive motion estimation and the background subtraction can be applied to the same or different frames.

In an example, information from the adaptive motion estimation block 1010 and information from the background subtraction block 1020 are used together in a segmentation block 1030. In the segmentation block, frame data can be parsed or analyzed to, remove background information or to isolate regions of motion. The parsed frame data can be further processed in a classification or detection block 1040. The classification or detection block 1040 can include or use a neural network-based classifier, such as trained on human figure data, to provide an indication of whether regions of interest, such as in the parsed frame data, include or are likely to include a human or part of a human.

Block 1050 can include post-processing and/or data aggregation. The post-processing can include further classification, such as performing facial recognition, demographic analysis, or other processing on recognized humans. In an example, data aggregation can include storing information, such as information resulting from the processing in the classification or detection block 1040, for later presentation to a user, such as in a dashboard format.

Figure 11:
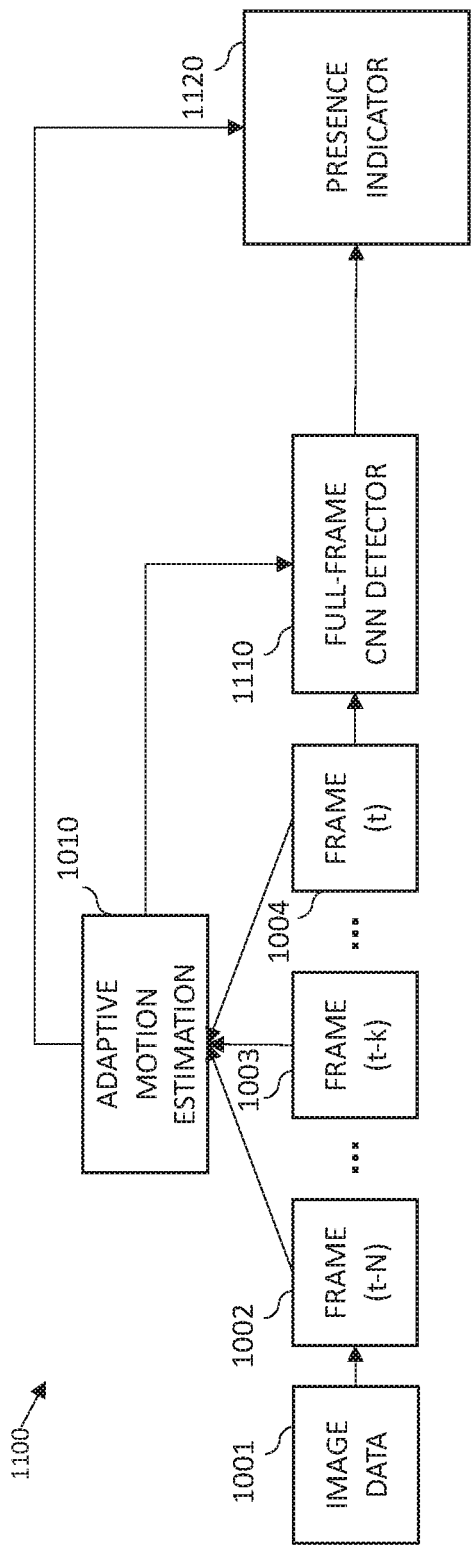
FIG. 11 illustrates generally an example of a schematic diagram that shows frame processing for use in human detection.

FIG. 11 illustrates generally an example of a second schematic diagram 1100 that shows frame processing for use in human detection. In an example, the system 100 can be configured to perform the various steps and logical blocks illustrated in the diagram 1100.

At block 1001, image data can be acquired by a camera, such as by one or more of the cameras 102b. The image data can include a series of frames including a first frame 1002, a second frame 1003, and a third frame 1004. The series of frames can include frames received over a period of time and the same or different duration can elapse between acquisition of each frame.

Information from the series of frames can be provided to an adaptive motion estimation block 1010. In the adaptive motion estimation block 1010, such as can be implemented by the body detector 108 and/or by another image processor circuit, any two or more of the frames from the series can be analyzed to determine if one or more objects in the frames represent, or are likely to represent, objects in motion.

Information from the adaptive motion estimation block 1010 can be shared with one or both of a full-frame CNN detector block 1110 and a presence indicator block 1120. In an example, the full-frame CNN detector block 1110 is configured to receive one or more of the frames from the series of frames and apply a neural network-based classifier to provide information about whether a human is detected anywhere in the frame. In an example, information from the adaptive motion estimation block 1010, such as including information about regions of interest for further processing, can be provided to the full-frame CNN detector block 1110. Since the full-frame CNN detector block 1110 operates on a full frame of data, the information from the adaptive motion estimation block 1010 can be used as a trigger or indication that the processing resources to perform a full-frame analysis are warranted for a particular frame and that the full-frame CNN detector block 1110 should perform its analysis.

Block 1120 includes a presence indicator. In an example, the presence indicator block 1120 generates an indication of a likelihood that a human or individual is present in an environment monitored the cameras 102b. The indication can include information from the adaptive motion estimation block 1010 about whether motion was detected, and optionally information about a type or kind of motion (e.g., rate of motion, direction of motion, area of a frame in which motion occurs, etc.), and the indication can include information from the full-frame CNN detector block 1110 about its neural network-based result of whether a human was detected in a particular full frame of interest. The presence indicator block 1120 can differently weight the information from the other blocks in providing its presence indication.

The various systems and methods discussed herein can further include systems, algorithms, methods, or processes that can extract data elements from image or video data, such as indications of human presence, absence, or human attributes. The data elements can be collected over time and can be analyzed and presented to a user in the form of a report such as a chart or dashboard. The report can include or represent any operational intelligence or report about an environment such as a place of business, a public or private building, a home or retail store, or other location. The reports can be interactive and can be generated or served from a web cloud server or locally from a PC or an edge device such as a camera. In an example, a report can be generated by one or more devices comprising the system 100, such as at one of the cameras 102b, at the computer system 106, or at the body detector 108. Data or metadata used to generate a report can be stored in the respective systems or in the video/image archive 104.

In an example, image information can include metadata with information about one or more objects in or characteristics of the image. In an example, the metadata can be provided as a result of a neural network-based or other image recognition analysis as described herein. In an example, the metadata can include information about a dwell time (e.g., how long an individual stood at a particular place or location), an object count (e.g., how many individuals reside in a defined area or zone by time), an object demographic (e.g., how many of the recognized individuals or bodies are male or female or have other characteristics), whether a particular activity was observed (e.g., an individual standing or facing a particular display area in a store), a waiting time or queue length, or more. The metadata can be collected and reported automatically to a user.

In an example, a dashboard or report can include a chart that shows events or occurrences over time. For example, a dashboard can be generated based on information from a front door camera. The dashboard can include a chart that shows times of day at which an individual was detected at the door and, optionally, a wait or dwell time at the door. In an example, the chart can include flags that indicate whether particular activities were detected, such as a mail or package delivery, a bell ring, or other activity. The dashboard can be adjusted by a user to show a particular time interval or activity.

In an example, a human count report can be generated. Based on information from one or more of the cameras 102b, one or more individuals or humans can be identified in an environment over time such as using the body detector 108. The number of individuals identified can be counted at different instances of time, such as corresponding to different frames or groups of frames of image data. In an example, the report can include information about a direction of travel of individuals in the environment, and can optionally include information about individuals who enter or exit the environment. In an example, the report can be used to determine an occupancy in an environment at a particular time.

In an example, a demographic report can be generated. The demographic report can be generated using information about one or more humans in an environment such as determined by the body detector 108. In an example, the body detector 108 is configured to perform facial recognition or to look for other clues or features to classify an individual by gender. In an example, the body detector 108 is configured to determine or estimate an age of each individual in the environment. In an example, the system is configured to determine gender information using different machine learning networks for different age groups. In an example, the system is configured to determine information about an individual's emotional state using information from a face. In an example, the system is configured to determine the emotion information using different machine learning networks for different age groups. The demographic report can include information about the genders, ages, emotions, or other aspects determined about the individuals in the environment.

In an example, a dwell time or service time report can be generated using information from the body detector 108. In an example, the body detector 108 is configured to identify individuals in an environment and their respective relative or absolute locations in the environment. The system can be configured to determine a waiting or dwelling time for each individual in each location, such as using motion information and other clues to determine how long an individual is in a location. In an example, a report about such waiting or dwelling time can include information about a start time or end time that an individual is detected or recognized in an environment. In an example, the system can analyze specified areas or regions of an environment and determine if a line or queue of individuals is present. The system can be configured to monitor the dwell time of the individuals in the queue to determine a wait time.

In an example, a heat map can be generated using information from the body detector 108. A heat map can include a pictorial representation of an occupancy that is typically color-coded to show areas of greater or lesser occupancy over time. For example, a heat map can be used together with, or generated from, dwell time or wait time information. In an example, a heat map can include information about how many individuals are present in each of one or more regions over time, and can use different colors to show a count of individuals and an amount of time spent by each individual (or by a group of individuals) in the one or more regions.

The various reports, maps, charts, dashboards, and other information can be stored or reported to a user. In an example, the information can be presented in the form of bar graphs or line charts, pie charts, or other pictorial representations. The information can be used by business operators, security personnel, homeowners, or others interested in learning more about occupancy or behaviors in various environments.

Figure 12:
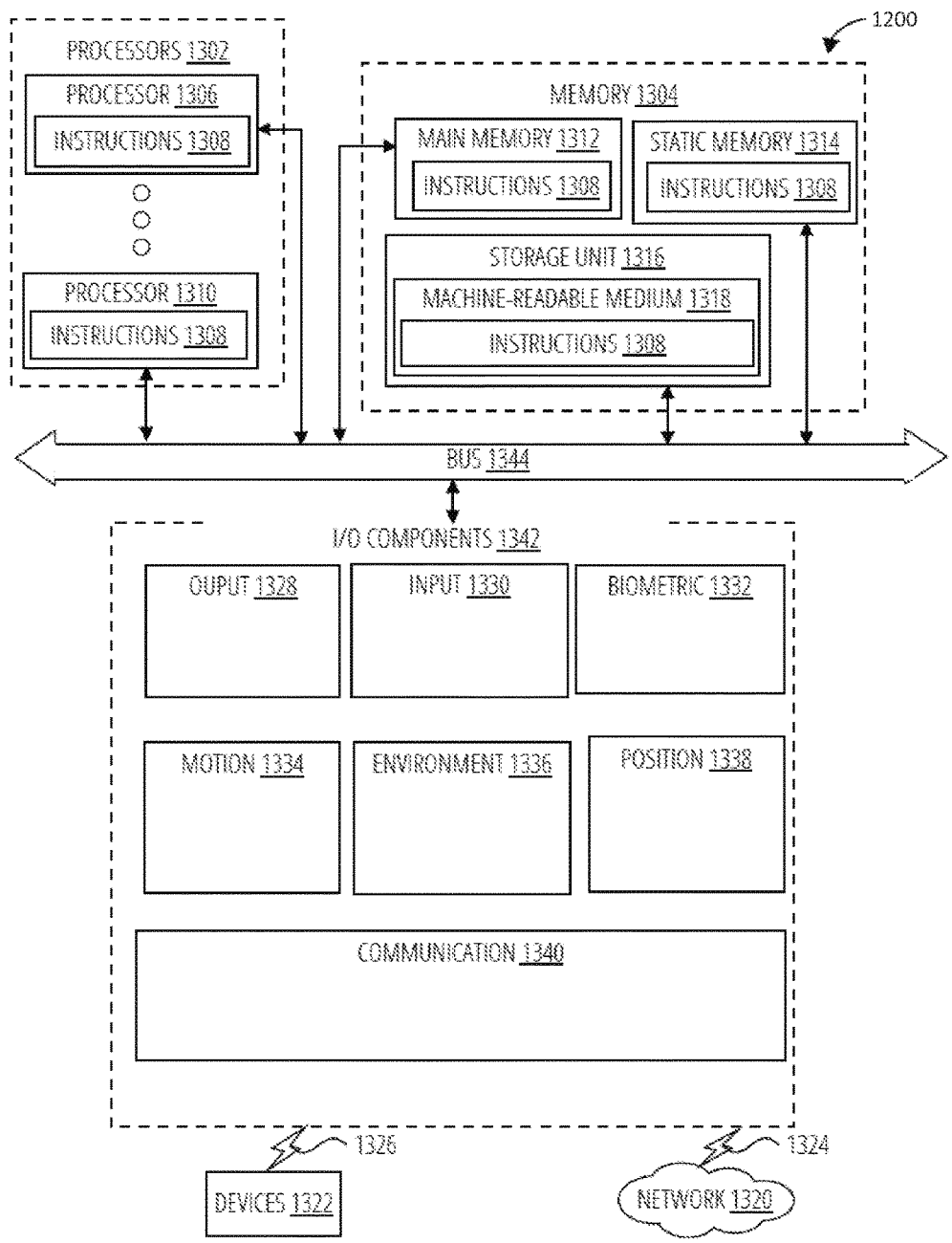
FIG. 12 illustrates generally an example of a machine in the form of a computer system within which a set of instructions can be executed to cause the machine to perform any one or more of the methods discussed herein.

FIG. 12 illustrates generally an example of a machine 1200 in the form of a computer system within which instructions 1308 can be executed to cause the machine to perform any one or more of the methods discussed herein. In an example, the machine 1200 comprises a portion of the system 100, or one or more portions of the system 100 comprise an instance of the machine 1200. The instructions 1308 can include software, a program, an application, an applet, an app, or other executable code that causes or configures the machine 1200 to perform any one or more of the methods discussed herein, or portions of such methods. For example, the instructions 1308 can cause the machine 1200 to execute any one or more of the methods described herein. The instructions 1308 transform a general, non-programmed machine into a particular machine configured or programmed to carry out the described and illustrated functions.

The machine 1200 can operate as a standalone device or can be coupled (e.g., networked) to other machines. In a networked deployment, the machine 1200 can operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 1200. Further, while only a single machine 1200 is illustrated, the term "machine" shall also be taken to include a collection of machines that individually or jointly execute the instructions 1308 to perform any one or more of the methodologies discussed herein.

The machine 1200 can include processors 1302, memory 1304, and I/O components 1342, which can be configured to communicate with each other via a bus 1344. In an example, the processors 1302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 1306 and a processor 1310 that execute the instructions 1308. The term "processor" is intended to include multi-core processors that can comprise two or more independent processors (sometimes referred to as "cores") that can execute instructions contemporaneously. Although FIG. 12 shows multiple processors 1302, the machine 1200 can include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, both accessible to the processors 1302 via the bus 1344. The main memory 1304, the static memory 1314, and storage unit 1316 store the instructions 1308 embodying any one or more of the methodologies or functions described herein. The instructions 1308 can also reside, completely or partially, within the main memory 1312, within the static memory 1314, within machine-readable medium 1318 within the storage unit 1316, within at least one of the processors 1302 (e.g., within the processor's cache memory), or any suitable combination thereof, during execution thereof by the machine 1200.

The I/O components 1342 can include a wide variety of components to receive input, provide output, produce output, transmit information, exchange information, capture measurements, and so on. The specific components 1342 that are included in a particular machine will depend on the type of machine. For example, portable machines such as mobile phones can include a touch input device or other such input mechanisms, while a headless server machine will likely not include such a touch input device. It will be appreciated that the I/O components 1342 can include many other components that are not shown in FIG. 12. In various example examples, the I/O components 1342 can include output components 1328 and input components 1330. In an example, the I/O components 1342 include one or more of the cameras 102b. The output components 1328 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1330 can include one or more cameras, alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example examples, the I/O components 1342 can include biometric components 1332, motion components 1334, environmental components 1336, or position components 1338, among a wide array of other components. For example, the biometric components 1332 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth.

The environmental components 1336 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that can provide indications, measurements, or signals corresponding to a surrounding physical environment. The position components 1338 can include location sensor components (e.g., a GPS receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 1342 further include communication components 1340 operable to couple the machine 1200 to a network 1320 or devices 1322 via a coupling 1324 and a coupling 1326, respectively. For example, the communication components 1340 can include a network interface component or another suitable device to interface with the network 1320. In further examples, the communication components 1340 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1322 can be another machine or any of a wide variety of peripheral devices (e.g., a peripheral device coupled via a USB).

Moreover, the communication components 1340 can detect identifiers or include components operable to detect identifiers. For example, the communication components 1340 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 1340, such as location via Internet Protocol (IP) geolocation, location via Wi-Fi® signal triangulation, location via detecting an NFC beacon signal that can indicate a particular location, and so forth.

The various memories (e.g., memory 1304, main memory 1312, static memory 1314, and/or memory of the processors 1302) and/or storage unit 1316 can store one or more sets of instructions and data structures (e.g., software) embodying or used by any one or more of the methodologies or functions described herein. These instructions (e.g., the instructions 1308), when executed by processors 1302, cause various operations to implement the disclosed examples.

The instructions 1308 can be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1308 can be transmitted or received using a transmission medium via the coupling 1326 (e.g., a peer-to-peer coupling) to the devices 1322.

VARIOUS NOTES & EXAMPLES

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) can be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

What is claimed is:

1. A method for performing a multiple-factor human recognition and validation routine that includes determining whether a human being is present in or absent from an environment monitored by a camera using image information from the camera, the method comprising:
receiving, at a first processor circuit, multiple frames from the camera, the multiple frames corresponding to a sequence of substantially adjacent time instances;
using the first processor circuit, determining whether a frame difference between a portion of at least first and second frames from among the multiple frames indicates movement by an object in the environment monitored by the camera; and
in response to the frame difference indicating movement by the object, continuing the human recognition and validation routine by:
using the first processor circuit, selecting a third frame from among the multiple frames for full-frame analysis by a first neural network;
using the first processor circuit, applying the third frame as an input to the first neural network and, in response, receiving a first indication of a likelihood that the third frame includes at least a portion of an image of a human being; and
using the first processor circuit, providing an indication that a human being is present in or absent from the environment monitored by the camera based on the identified frame difference and on the received first indication of the likelihood that the third frame includes at least a portion of an image of a human being, wherein the indication that the human being is present includes an activity report with information about whether a particular activity was performed by the human being in the environment monitored by the camera.

2. The method of claim 1, wherein the selecting the third frame from among the multiple frames includes selecting a frame that includes information about the object in the environment.

3. The method of claim 1, wherein the selecting the third frame from among the multiple frames includes selecting one of the first and second frames.

4. The method of claim 1, wherein the identifying the change in the one or more portions of the at least first and second frames includes applying the first frame or second frame as an input to a second neural network and, in response, receiving a second indication of a likelihood that the first or second frame includes at least a portion of an image of a human being; and
wherein the providing the indication that a human being is present or absent includes using the first indication of a likelihood that the third frame includes at least a portion of an image of a human being, and using the second indication of a likelihood that the first or second frame includes at least a portion of an image of a human being.

5. The method of claim 4, further comprising differently weighting the likelihood indications from the first and second neural networks.

6. The method of claim 4, wherein the applying the first frame or the second frame as an input to the second neural network includes applying information corresponding to the portion in which the change was identified and excluding information not corresponding to the portion in which the change was identified.

7. The method of claim 1, wherein when the processor circuit provides an indication that a human being is present in the environment, the method further comprises determining whether the human being is in a permitted or unpermitted location in the environment.

8. The method of claim 1, further comprising generating a dashboard of information about the indication that a human being is present in or absent from the environment monitored by the camera, wherein the dashboard comprises the activity report and one or more of a dwell time indicator, a heat map indicating a location of the human being in the environment, or demographic indicator that includes demographic information about the human being.

9. The method of claim 1, further comprising generating a dashboard of information about the indication that the human being is present in the environment monitored by the camera, the dashboard comprising dwell time information about the human being at a particular location in the environment.

10. The method of claim 9, wherein the dashboard further comprises occupancy information about the human being, and about one or more other human beings over time, for the particular location in the environment.

11. The method of claim 10, wherein the dashboard further comprises demographic information about the human being and about the one or more other human beings, and wherein the demographic information is provided at least in part using the first processor circuit and the first neural network.

12. A machine learning-based multiple-factor image recognition system for determining when human beings are present in or absent from an environment and reporting information about an occupancy of the environment over time, the system comprising:
a camera configured to receive a series of images of the environment, wherein each of the images is a different frame acquired at a different time; and
an image processor circuit configured to:
determine whether a frame difference, between a portion of at least first and second frames acquired by the camera, indicates movement by one or more objects in the environment monitored by the camera;
when the frame difference indicates movement by the object, configuring the image processor circuit to:
select a third frame from among the multiple frames for full-frame analysis by a first neural network;
apply the third frame as an input to the first neural network and in response receive a first indication that the third frame includes an image of at least a portion of a first human being;
determine whether the first human being is present in or absent from the environment based on the identified frame difference and on the received first indication;
determine whether an activity of interest was performed by the first human being in the environment; and
store information about the first human being, including information about whether the activity of interest was performed by the first human being, in a memory circuit, the stored information further including at least one of demographic information, dwell time information, or location information about the first human being.

13. The system of claim 12, further comprising a second processor circuit configured to:
receive information from the memory circuit about the first human being and other human beings detected in the environment using information from the camera; and generate a pictorial dashboard for presenting to a user the demographic information, dwell time information, and location information for the first human being and for the other human beings.

14. The system of claim 12, further comprising a second camera configured to receive a series of images of a second environment, wherein each of the images is a different frame acquired at a different time; and
wherein the image processor circuit is configured to determine whether the first human being is present in or absent from the second environment based on information from the second camera.

15. The system of claim 12, further comprising:
a second camera configured to receive a series of images of a second environment, wherein each of the images is a different frame acquired at a different time; and
a second processor circuit configured to:
receive information from the memory circuit about the first human being and receive information about one or more other human beings detected in images from the second camera;
perform facial recognition to determine if the first human being is a recognized individual; and
generate a dashboard for presenting to a user information about the first human being together with information about the one or more other human beings.

16. The system of claim 12, wherein the image processor circuit is configured to use the first neural network to determine the demographic information about the first human being, and wherein the image processor circuit is configured to store, in the memory circuit, the demographic information, dwell time information, and location information about the first human being.

17. A machine learning-based image classifier system for determining whether a human being is present in or absent from an environment using neural network processing, the system comprising:
a first camera configured to receive a series of images of the environment, wherein each of the images corresponds to a different frame acquired at a different time, and wherein the series of images comprises image information in a YUV color space;
an image processor circuit configured to:
identify, using at least the Y information from the YUV color space, a difference between a portion of at least first and second frames acquired by the first camera,
wherein when the difference indicates movement by the object in the environment monitored by the first camera then further configuring the processor to:
select a third frame from among the multiple frames for full-frame analysis using a first neural network;
apply the third frame as an input to the first neural network and in response determine a first indication of a likelihood that the third frame includes at least a portion of an image of a first human being; and
provide an indication that a human being is present in or absent from the environment based on the identified difference and on the determined first indication of the likelihood that the third frame includes at least a portion of an image of the first human being; and
a second processor circuit configured to generate a visual dashboard of information for presentation to a user about the first human being, the dashboard comprising dwell time information about the first human being for a particular location in the environment and dwell time information about one or more other human beings over time for the same particular location in the environment.

18. The system of claim 17, further comprising:
a second camera configured to receive a series of images of the same or different environment, wherein each of the images corresponds to a different frame; and
wherein the second processor circuit is configured to generate the visual dashboard of information using the series of images from the second camera.

19. The system of claim 17,
wherein the image processor circuit is configured to identify the difference between a portion of at least first and second frames acquired by the first camera using only the Y information from the YUV color space; and
wherein the image processor circuit is configured to apply the Y information about the third frame from the YUV color space as the input to the first neural network.

20. The system of claim 17, wherein the image processor circuit is configured to identify the difference between a portion of at least first and second frames acquired by the first camera using Y, U, and V information from the YUV color space.

* * * * *